United States Patent
Wada et al.

(10) Patent No.: US 9,086,480 B2
(45) Date of Patent: *Jul. 21, 2015

(54) OPTICAL DISTANCE-MEASURING DEVICE AND ELECTRONIC DEVICE

(75) Inventors: Hideo Wada, Osaka (JP); Akifumi Yamaguchi, Osaka (JP); Masaru Kubo, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 459 days.

This patent is subject to a terminal disclaimer.

(21) Appl. No.: 13/536,415

(22) Filed: Jun. 28, 2012

(65) Prior Publication Data

US 2013/0001398 A1     Jan. 3, 2013

(30) Foreign Application Priority Data

Jun. 29, 2011  (JP) ................................. 2011-144819
Mar. 26, 2012  (JP) ................................ 2012-070182

(51) Int. Cl.

| | |
|---|---|
| *G01C 21/02* | (2006.01) |
| *G01S 17/48* | (2006.01) |
| *G02B 1/04* | (2006.01) |
| *G01C 3/08* | (2006.01) |
| *G02B 19/00* | (2006.01) |

(Continued)

(52) U.S. Cl.
CPC . *G01S 17/48* (2013.01); *G01C 3/08* (2013.01); *G01S 7/4813* (2013.01); *G02B 1/041* (2013.01); *G02B 7/022* (2013.01); *G02B 19/0014* (2013.01); *G02B 19/0085* (2013.01)

(58) Field of Classification Search
CPC ..... G01S 7/4813; G02B 1/041; H01L 23/145; H01L 23/3107; H01L 23/3135; H01L 23/3142; H01L 23/315

USPC .......... 250/206, 239, 559.23, 559.31; 257/81, 257/667; 356/3.01, 3.05

See application file for complete search history.

(56) References Cited

U.S. PATENT DOCUMENTS

| | | | |
|---|---|---|---|
| 6,046,795 A | 4/2000 | Sugiyama et al. | |
| 6,337,736 B1 | 1/2002 | Sugiyama et al. | |
| 7,119,912 B2 * | 10/2006 | Takaoka ........................ | 356/623 |

(Continued)

FOREIGN PATENT DOCUMENTS

| | | |
|---|---|---|
| JP | 6-109553 | 4/1994 |
| JP | 11-281351 A | 10/1999 |

(Continued)

*Primary Examiner* — Georgia Y Epps
*Assistant Examiner* — Kevin Wyatt
(74) *Attorney, Agent, or Firm* — Birch, Stewart, Kolasch & Birch, LLP

(57) ABSTRACT

A lens frame, made from metal, retaining a light-emitting lens and a light-receiving lens is retained between a second mold and a third mold both of which are made from light-shielding resins. Anchors are formed by filling light-shielding resin for forming the third mold into fixing slots formed in an upper surface of the second mold and through holes formed in the lens frame. Since the lens frame is made from metal, thermal expansion of the lens frame is hardly caused by ambient temperature changes and self-heating. This causes little difference in the amount of change in difference between the lenses. Further, the lens frame is fixed with anchors between the second mold and the third mold. This suppresses the occurrence of sliding caused by difference in thermal expansion coefficient between the lens frame and the second and third molds.

16 Claims, 22 Drawing Sheets

(51) Int. Cl.
*G02B 7/02* (2006.01)
*G01S 7/481* (2006.01)

(56) References Cited

U.S. PATENT DOCUMENTS

| | | | |
|---|---|---|---|
| 7,167,653 B2 * | 1/2007 | Kurata et al. | 398/135 |
| 7,391,582 B2 | 6/2008 | Inui et al. | |
| 2004/0263824 A1 | 12/2004 | Yamamoto et al. | |
| 2009/0097010 A1 * | 4/2009 | Yamaguchi | 356/4.01 |
| 2010/0045963 A1 * | 2/2010 | Yamaguchi et al. | 356/4.01 |
| 2011/0194097 A1 | 8/2011 | Yamaguchi et al. | |

FOREIGN PATENT DOCUMENTS

| | | |
|---|---|---|
| JP | 2000-331577 A | 11/2000 |
| JP | 2001-99643 A | 4/2001 |
| JP | 2002-16196 A | 1/2002 |
| JP | 2002-83917 A | 3/2002 |
| JP | 2005-17078 A | 1/2005 |
| JP | 2006-337320 A | 12/2006 |
| JP | 2011-43433 A | 3/2011 |
| JP | 2012-37276 A | 2/2012 |

* cited by examiner

US 9,086,480 B2

OPTICAL DISTANCE-MEASURING DEVICE AND ELECTRONIC DEVICE

This Nonprovisional application claims priority under 35U.S.C. §119(a) on Japanese Patent Application No. 2011-144819 filed on Jun. 29, 2011 and 2012-70182 filed on Mar. 26, 2012, the entire contents of which are hereby incorporated by reference.

TECHNICAL FIELD

The present invention relates to an optical distance-measuring device that optically measures a distance to an object subject to distance measurement. Particularly, the present invention relates to an optical distance-measuring device having a high distance measurement accuracy even when it thermally expands or contracts due to temperature changes caused during reflow or the like, and to an electronic device including the optical distance-measuring device.

BACKGROUND ART

FIG. 17 is an explanatory view of the principle of a typical triangulation method.

As shown in FIG. 17, the conventional and general optical distance-measuring device includes, for example, a light-emitting element 201, a light-receiving element 202, a light-emitting lens 203, and a light-receiving lens 204.

In the optical distance-measuring device, light flux emitted from the light-emitting element 201 placed at the origin (0, 0) is turned into substantially parallel light flux (light-emission axis 205) by the light-emitting lens 203 placed at the point A (0, d). The substantially parallel light flux is applied as spot light onto the point B (0, y) on an object 211 subject to distance measurement. Light flux (light-receptive axis 206) reflected by the object 211 subject to distance measurement is gathered by the light-receiving lens 204 (light-gathering lens) placed at the point C (L, d), and the gathered light forms a light-receiving spot by being focused on the point D (L+1. 0) on the light-receiving element 202, which is placed on an axis lying along an x-direction. Here, assume that the point E (L, 0) is a point at which a line passing through the point C (center of the light-receiving lens 204) and being parallel to a y-axis intersects with a light-receiving surface of the light-receiving element 202. In this case, a triangle ABC is similar to a triangle ECD. Therefore, when the position of the light-receiving spot is detected by means of the light-receiving element 202 to measure a side ED (=1), a distance y to the object 211 subject to distance measurement is calculated by the following equation (1):

$$y = \frac{L \cdot D}{l}. \quad (1)$$

As described above, the optical distance-measuring device detects the position of a light-receiving spot formed on the light-receiving element 20, and calculates the distance to the optical distance-measuring device in accordance with the equation (1). In order to measure the distance accurately, a distance L between the light-emitting lens 203 and the light-receiving lens 204 and a distance d between the light-receiving lens 204 and the light-receiving element 202 need to be fixed.

FIG. 18 is a cross-sectional view showing the configuration of a typical optical distance-measuring device 300 using the above principle.

As shown in FIG. 18, the optical distance-measuring device 300 includes a light-emitting element 201, the light-receiving element 202, the light-emitting lens 203, and the light-receiving lens 204, all of which are retained by a case 301. The case 301 is usually made from a light-shielding resin for cost reduction.

In the optical distance-measuring device 300, the case 301, which is usually formed from a resin having a high thermal expansion coefficient, expands and contracts due to ambient temperature changes. This causes the following problem. For example, expansion of the case 301 due to rise in ambient temperature causes shifts of the light-emitting lens 203 and the light-receiving lens 204 to the positions indicated by broken lines, respectively. This changes (increases) the distance L between the lenses. As a result, an optical axis 205a of the light-emitting lens 203 and an optical axis 206a of the light-receiving lens 204 at room temperature turn to an optical axis 205b and an optical axis 206b as indicated by broken lines, respectively. In this case, the position of a light-receiving spot formed on the light-receiving element 202 shifts outwards as compared with the position of the light-receiving spot at room temperature while the position of the object 211 subject to distance measurement remains unchanged. Thus, at the rise in ambient temperature, for example, the position of the object 211 subject to distance measurement is incorrectly measured as being closer than its actual position.

Patent Literatures 1 and 2 disclose the techniques that solve the above problem. FIG. 19 is a cross-sectional view showing the configuration of an optical distance-measuring device 400 described in Patent Literature 1. FIG. 20 is a cross-sectional view showing the configuration of an optical distance-measuring device 500 described in Patent Literature 2.

As shown in FIG. 19, the optical distance-measuring device 400 includes a light-emitting element 401, a light-receiving element 402, a floodlighting lens (light-emitting lens) 403, and a light-receiving lens 404. The floodlighting lens 403 and a package 405 to house the light-emitting element 401 are fixed in a first case 406, while the light-receiving lens 404 and a package 407 to house the light-emitting element 402 are fixed in a second case 408. The first case 406 and the second case 408 are connected to each other with a main unit 409, which constitutes a main case 410.

In the optical distance-measuring device 400 with such configuration, even when thermal expansion of the main case 410 occurs, the light-emitting element 401 and the floodlighting lens 403 are kept in position to each other in the first case 406, and the light-receiving element 402 and the light-receiving lens 404 are kept in position to each other in the second case 408. This causes no changes in distance from the center position of the light-receiving element 402 to the position of a reflected light spot, which secures an accuracy of distance measurement.

As shown in FIG. 20, the optical distance-measuring device 500 includes an imaging lenses 501a and 501b, a retainer 502 for the imaging lenses 501a and 501b, a CCD packages 503a and 503b (optical sensor arrays), and a retainer 504 for the CCD packages 503a and 503b. In the optical distance-measuring device 500, the imaging lenses 501a and 501b and the retainers 502 and 504 are all formed from the same material which is made from non-hygroscopic plastic.

In the optical distance-measuring device 500 with such configuration, the imaging lenses 501a and 501b and the retainers 502 and 504 stretch evenly by thermal expansion.

This makes it possible to prevent decreased distance measurement accuracy caused by temperature changes.

In the case of the optical distance-measuring devices 400 and 500, the light-emitting element, the light-receiving element, and the lens retainers evenly expand and contract at the occurrence of ambient temperature changes, the light-emitting element and the light-receiving element are kept in position to the lenses to satisfy the principle of triangulation. However, the optical distance-measuring devices 400 and 500 have the following problem. That is, in the event of the occurrence of self-heating in the light-emitting element and the light-receiving element, uneven temperature changes in the entire device cause differences in temperature between the components located near the light-emitting element or the light-receiving element and the components located near the lenses. Accordingly, expansion and contraction of the components occur in different amounts. This causes a failure to keep the light-emitting element and the light-receiving element in position to the lenses.

Any methods for correcting the position of the light-receiving spot at the occurrence of such uneven temperature changes are not described in Patent Literatures 1 and 2. Therefore, the techniques described in Patent Literatures 1 and 2 cannot prevent decreased distance measurement accuracy caused by self-heating of the light-emitting element and the light-receiving element, which results in unsatisfactory utilization of the principle of triangulation method.

A technique for resolving such a problem is disclosed in Patent Literature 3. FIG. 21 is a cross-sectional view showing the configuration of an optical distance-measuring device 600 described in Patent Literature 3.

As shown in FIG. 21, the optical distance-measuring device 600 includes a pair of lenses 601a and 601b, a pair of CCD packages 602a and 602b, a lens retainer 603, a CCD retainer 604, and temperature sensors 605 and 606. The temperature sensor 605 is mounted on the lens retainer 603 in an area between the lenses 601a and 601b. The temperature sensor 606 is mounted on the retainer 604 in an area between the CCD packages 602a and 602b.

In the optical distance-measuring device 600 with such configuration, outputs of the temperature sensors 605 and 606 are used to obtain temperature difference between the lens retainer 603 and the CCD retainer 604 at the occurrence of self-heating of CCD chips 607a and 607b (light-receiving elements) in the respective CCD packages 602a and 602b. The obtained temperature difference is used to correct the amount of shift of object images formed on the CCD chips 607a and 607b. This makes it possible to correct difference in degree of thermal expansion between the lens retainer 603 and the CCD retainer 604 at the occurrence of self-heating of the CCD chips 607a and 607b, and to thus maintain distance measurement accuracy.

However, in the optical distance-measuring device 600, the temperature sensors 605 and 606 are necessary for preventing decreased distance measurement accuracy. Further, the temperature sensors 605 and 606 cannot be embedded in the CCD chips 607a and 607b, or other components, and must be separately disposed in contact with the lens retainer 603 and the CCD retainer 604, respectively. Besides, the temperature sensors 605 and 606 require wirings for transmission of output signals from the temperature sensors 605 and 606. This complicates the structure of the optical distance-measuring device 600, thus resulting in increased number of steps for assembly of the optical distance-measuring device 600 and difficulty in offering the optical distance-measuring device 600 at low cost.

One approach for realizing the optical distance-measuring device 600 with more simplified structure is considered to provide only one of the temperature sensors 605 and 606. However, this approach causes the problems described below.

FIG. 22 is a cross-sectional view showing the configuration of a conventional optical distance-measuring device 700.

As shown in FIG. 22, the optical distance-measuring device 700 is such that ambient heat evenly heats or cools the entire optical distance-measuring device 700 including its side surfaces and expands or contracts the components. This changes a distance between a light-emitting lens 703 and a light-receiving lens 704 and a distance between a light-emitting element 701 and a light-receiving element 702. Meanwhile, self-heating of the light-emitting element 701 and the light-receiving element 702 due to energization directly heats and expands a light-shielding resin section 705 in which the elements 701 and 702 are sealed. Further, heat emitted from the light-emitting element 701 and the light-receiving element 702 and heat transferred from the light-shielding resin section 705 to a lens retainer 706 that retains the light-emitting lens 703 and the light-receiving lens 704 indirectly heats and expands lens retaining parts of the lens retainer 706.

Therefore, when self-heating occurs, the light-shielding resin section 705 and the lens retainer 706, which are different in temperature from each other, expand depending upon their own thermal expansion coefficients, according to their respective temperature changes. Therefore, the amount of change in distance between the light-emitting lens 703 and the light-receiving lens 704 varies as follows. That is, when the optical distance-measuring device 700 is heated by ambient heat, the distance changes in amounts as indicated by arrows I. On the other hand, when the optical distance-measuring device 700 is heated by self-heating, the distance changes in amounts as indicated by arrows J.

Hence, in order to predict how much the distance between the elements 701 and 702 and the distance between the lenses 703 and 704 change, the optical distance-measuring device 700 needs to be provided with temperature sensors for detecting the temperatures of the light-shielding resin section 705 and the lens retainer 706 separately.

Even in the optical distance-measuring device 600, the amount of change in distance between the lenses 601a and 601b varies from the case where the optical distance-measuring device 600 is heated by ambient heat to the case where it is heated by self-heating. If the optical distance-measuring device 600 is configured to have the temperature sensor 605 mounted only on the lens retainer 603 or to have the temperature sensor 606 mounted only on the CCD retainer 604, the following inconvenience is caused. For example, in a case where temperature rise occurs, it is unclear whether temperature changes have been caused by rise in ambient temperature or self-heating. This causes a failure to exactly figure out a positional relation between the lenses 601a and 601b and the CCD chips 607a and 607b, resulting in decreased distance measurement accuracy.

For the optical distance-measuring device 300 shown in FIG. 18, for example, one approach for suppressing changes in distance between the light-emitting lens and the light-receiving lens due to thermal expansion caused by ambient heat and self-heating is considered to make part of the case 301, which retains the light-emitting lens 203 and the light-receiving lens 204, formed from metal. Specifically, a retaining part for the light-emitting lens 203 and the light-receiving lens 204 is realized by a metallic frame (lens frame), and the lens frame is attached to the case 301. Since some parts of the case 301 are made from metal having a low thermal expansion coefficient, it is possible to suppress the change in distance between the light-emitting lens and the light-receiving lens due to thermal expansion, and to eliminate variations of the change in distance between the light-emitting lens and the light-receiving lens due to thermal expansion caused by ambient heat and self-heating. Further, it is possible to realize cost reduction as compared with the configuration with the case 301 entirely made from metal.

CITATION LIST

Patent Literatures

Patent Literature 1
Japanese Patent Application Publication, Tokukai, No. 2006-337320 A (Publication Date: Dec. 14, 2006)
Patent Literature 2
Japanese Patent Application Publication, Tokukaihei, No. 11-281351 A (Publication Date: Oct. 15, 1999)
Patent Literature 3
Japanese Patent Application Publication, Tokukai, No. 2001-99643 A (Publication Date: Apr. 13, 2001)

SUMMARY OF INVENTION

Technical Problem

Meanwhile, in order to make an electronic device equipped with an optical distance-measuring device, it is necessary to mount the optical distance-measuring device on a substrate or the like. The mounting process requires, for input and output of signals to and from the light-emitting element and the light-receiving element and for supply of power to them, that a plurality of terminals provided on the lead frame where the light-emitting element and the light-receiving element are mounted are soldered to the substrate.

With recent miniaturization of optical distance-measuring devices, spacing between the terminals is getting small. Further, there is a demand for effective mass production of electronic devices equipped with such miniaturized optical distance-measuring devices. In view of this, reflow soldering as means for soldering the terminals is highly demanded rather than the conventional soldering by hand.

When the optical distance-measuring devices are run through a reflow furnace, they are exposed to high temperatures of not less than 260° C. for a short period of time. In this case, the resins forming the components such as the light-emitting lens, the light-receiving lens, the light-emitting element, the light-receiving element, the case, and an element sealing section for sealing the light-emitting lens and the light-receiving lens expand according to their thermal expansion coefficients. In the similar manner, the leadframe and the lens frame expand according to their thermal expansion coefficients.

However, the thermal expansion coefficients of the metals making up the leadframe and the lens frame are lower than those of the resins. This generates stresses resulting from difference in thermal expansion coefficient at the interface between the leadframe and the element sealing section, at the interface between the lens frame and the case, and at the interface between the lens frame and the lens. Further, when the optical distance-measuring devices are taken out of the reflow furnace, they are rapidly cooled down to temperatures near room temperature. This causes rapid contraction of the optical distance-measuring devices having been expanded in high-temperature atmosphere.

In the process from heating to cooling, in terms of the case and the lens frame, for example, if adhesiveness between the case and lens frame is insufficient, the lens frame slides over the case due to the stress generated at the interface between the case and the lens frame during a rise in temperature in a high-temperature atmosphere. Further, the stress works at the interface between the lens frame and the case during a rapid drop in the temperature to room temperature, and the lens frame slides over the case. This causes changes in relative positional relation between the light-emitting lens and the light-emitting element and relative positional relation between the light-receiving lens and the light-receiving element, as compared with the relative positional relations obtained before the optical distance-measuring devices are mounted through reflow. This results in shift of the position of the light-receiving spot, as explained above about the principle of triangulation. The distance obtained by calculation through the aforementioned equation (1) using the obtained positions is different from the actual distance.

If sliding occurred at the cooling is exactly opposite to the sliding occurred at the previous heating, the positional relation between the case and the lens frame returns to its original positional relation, and the above problem caused by reflow does not occur. However, in practice, the positional relation between the case and the lens frame does not return to its original positional relation.

In terms of the interface between the case and the lens frame, a vector of strain generated at the interface from the expansion caused at the heating is not completely opposite to a vector of strain generated at the interface from the contraction caused at the cooling. For example, since a temperature rise profile is different from a temperature drop profile during reflow, interior temperature distribution in the interface at the heating is not symmetric with respect to interior temperature distribution in the interface at the cooling. This causes difference between the sliding occurred at the heating and the sliding occurred at the cooling, thus changing relative positions of the light-emitting lens and the light-receiving lens with respect to the light-emitting element and the light-receiving element.

Thus, even if a metallic lens frame is used, sliding occurs at the interface between the lens frame and the resin components due to rapid heating and cooling. This causes the problem that an accuracy of distance measurement decreases.

Solution to Problem

An object of the present invention is to provide an optical distance-measuring device with high heat resistance and high accuracy.

An optical distance-measuring device according to the present invention is an optical distance-measuring device that measures a distance to an object subject to distance measurement, including: a light-emitting element mounted on a mounting member; a light-emitting lens that irradiates the object subject to distance measurement with light emitted from the light-emitting element; a light-receiving element, mounted on the mounting member, that detects a position of convergence of light reflected by the object subject to distance measurement; a light-receiving lens that causes the reflected light to converge onto the light-receiving element; light-transmitting resin members that causes the light-emitting element and the light-receiving element to be sealed therewith; a first light-shielding resin member that covers the light-transmitting resin member so as to form an interior space that allows the light emitted from the light-emitting element to reach the light-emitting lens and an interior space that allows the reflected light entered from the light-receiving lens to reach the light-receiving element; a lens frame, formed from metal, that retains the light-emitting lens and the light-receiving lens; and a second light-shielding resin member that causes the first light-shielding resin member to be sealed therewith and retains the lens frame together with the first light-shielding resin member, the lens frame having through holes, one of the first light-shielding resin member and the second light-shielding resin member having projections that project toward the other resin member, the other resin member being connected with jutting parts of the respective projections in such a state that the projections pass through the corresponding through holes and jut from the lens frame.

In the above configuration, the projections provided on one of the first light-shielding resin member and the second light-shielding resin member are connected to the other resin member with the jutting parts that penetrates the through holes of the lens frame and jut from the lens frame. In this manner, the first light-shielding resin member and the second light-shielding resin member are connected to each other with the projections. This allows the lens frame to be fixed with the projections in a state that the lens frame is retained by the first light-shielding resin member and the second light-shielding resin member. Therefore, even when stresses caused by thermal expansion work at the interfaces between the lens frame and the first and second light-shielding resin members due to ambient temperature changes caused during reflow of the optical distance-measuring device, sliding does not occur at the interfaces between the lens frame and the first and second light-shielding resin members.

Therefore, even after reflow, the light-emitting lens and the light-receiving lens are kept in relative position to the light-emitting element and the light-receiving element. Thus, it is possible to maintain heat resistance and distance measurement accuracy of the optical distance-measuring device at high levels.

Advantageous Effects of Invention

With the above-described configurations, an optical distance-measuring device according to the present invention brings the effect of facilitating high heat resistance and high accuracy of the optical distance-measuring device.

DESCRIPTION OF EMBODIMENTS

First Embodiment

The following will describe one embodiment according to the present invention with reference to FIGS. 1(a), 1(b), 2, 3(a) through 3(d), 4 through 7, 8(a) through 8(c), and 9(a) through 9(c).

[Configuration of Optical Distance-Measuring Device]

Figure 1:
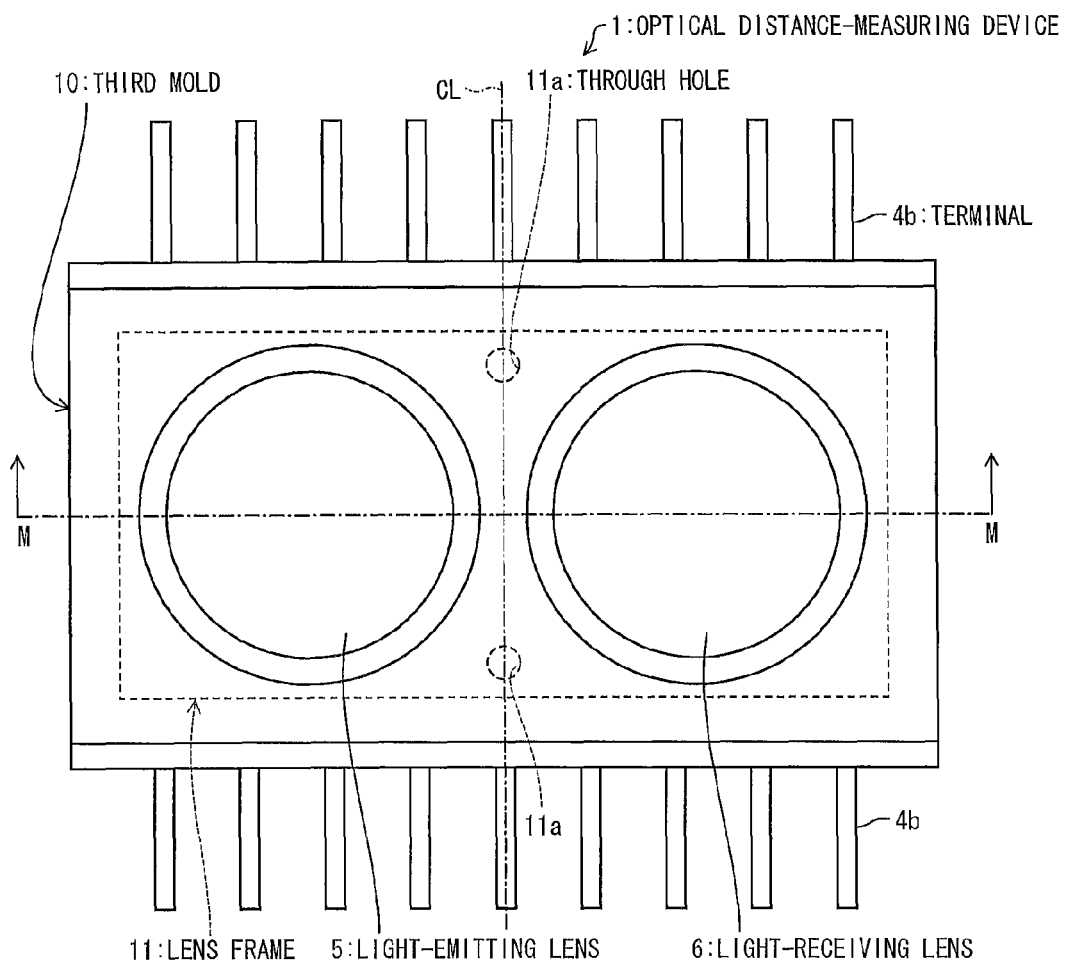
FIG. 1(a) is a plan view showing the configuration of an optical distance-measuring device according to First Embodiment of the present invention.
FIG. 1(b) is a cross-sectional view taken along a M-M line shown in the plan view of FIG. 1(a).
Figure 1:
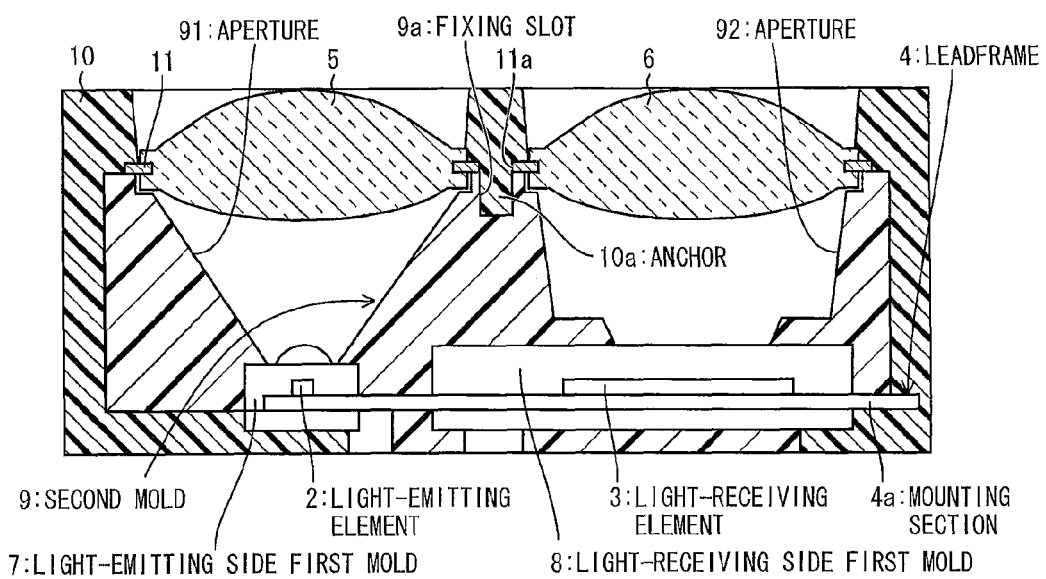
Figure 2:
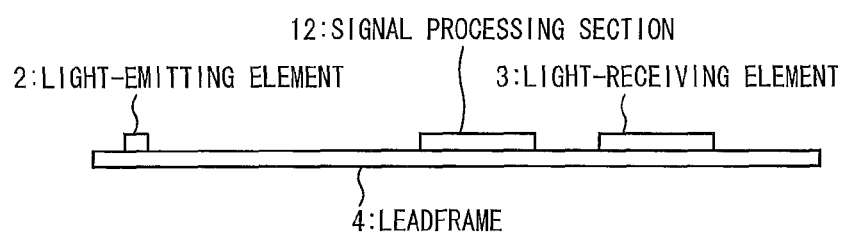
FIG. 2 is a side view showing arrangements of a light-emitting element and a light-receiving element in the optical distance-measuring device.

FIGS. 1(a) and 1(b) are a plan view and a cross-sectional view, respectively, showing the configuration of an optical distance-measuring device 1 according to one embodiment of the present invention. FIG. 2 is a side view showing arrangements of a light-emitting element 2 and a light-receiving element 3 disposed in the optical distance-measuring device 1.

The optical distance-measuring device 1 according to the present embodiment is a device for measuring a distance to an object subject to distance measurement. As shown in FIGS. 1(a) and 1(b), the optical distance-measuring device 1 includes the light-emitting element 2, the light-receiving element 3, a leadframe 4, a light-emitting lens 5, a light-receiving lens 6, a light-emitting side first mold 7, a light-receiving side first mold 8, a second mold 9, a third mold 10, and a lens frame 11.

The leadframe 4 (mounting member) has a mounting section 4a and a plurality of terminals 4b. The mounting section 4a is formed in flat plate shape so as to have the light-emitting element 2 and the light-receiving element 3 mounted thereon. The terminals 4b are formed integrally with the mounting section 4a so as to extend in a direction orthogonal to an M-M line from two opposite external wall surfaces on longitudinal sides of the optical distance-measuring device 1.

The light-emitting element 2 is mounted at one end of the mounting section 4a of the leadframe 4 and sealed with the light-emitting side first mold 7 (light-transmitting resin) that is made from a light-transmitting resin. Meanwhile, the light-receiving element 3 is mounted at the other end of the mounting section 4a of the leadframe 4 and sealed with the light-receiving side first mold 8 (light-transmitting resin) that is made from the same light-transmitting resin as for the light-emitting side first mold 7. The light-emitting side first mold 7 and the light-receiving side first mold 8 are covered with the second mold 9 (first light-shielding resin) that is made from a light-shielding resin. This prevents light from directly entering the light-receiving element 3 from the light-emitting element 2.

The light-receiving element 3 can be a PSD (Position Sensitive Detector), a linear sensor with a plurality of photodiodes (PD), an image sensor, or the like. The light-receiving element 3 converts the amount of received light into an electrical signal to detect a position of a spot to which incoming reflected light converges. The light-receiving element 3 includes a signal processing section that subjects that electrical signal to predetermined computation. Alternatively, a signal processing section 12 may be provided on the leadframe 4 independently of the light-receiving element 3, as shown in FIG. 2.

The light-emitting element 2 and the light-receiving element 3 may be disposed not on the leadframe 4 but on a substrate (mounting member) having interconnections formed on its surface.

The second mold 9 has apertures 91 and 92. The aperture 91 is formed in bowl shape to be open above the light-emitting element 2. The aperture 92 opens above the light-receiving element 3 and is formed so as to have a surface inclined more steeply than that of the aperture 91. On an upper end of the second mold 9, the light-emitting lens 5 and the light-receiving lens 6 are disposed over the apertures 91 and 92, respectively. The aperture 91 forms an interior space which allows light emitted from the light-emitting element 2 to reach the light-emitting lens 5. The aperture 92 forms an interior space which allows light reflected by the object subject to distance measurement incident from the light-receiving lens 6 to reach the light-receiving element 3.

The light-emitting lens 5, which has a light-transmitting property, converts light emitted from the light-emitting element 2 into parallel light beams for application to the object subject to distance measurement. The light-receiving lens 6, which has a light-transmitting property, causes light reflected by the object subject to distance measurement to converge onto a light-receiving surface of the light-receiving element 3. The light-emitting lens 5 and the light-receiving lens 6 are retained by the lens frame 11. The lens frame 11 is disposed at a given position on the second mold 9, so that the light-emitting lens 5 and the light-receiving lens 6 are disposed over the apertures 91 and 92, respectively. Further, the light-emitting lens 5 and the light-receiving lens 6 are formed from a light-transmitting resin so as to have a light-transmitting property. The light-transmitting resin can be a publicly-known light-transmitting resin (e.g. epoxy resin) commonly used to form lenses.

The light-transmitting resins as materials for the light-emitting lens 5 and the light-receiving lens 6 may be identical with each other, or may be different from each other.

The third mold 10 (second light-shielding resin member), which is made from a light-shielding resin, is formed so as to cover an outer periphery surface of the second mold 9 and an upper end surface of the lens frame 11 and to make the light-emitting lens 5 and the light-receiving lens 6 exposed. With this arrangement, the third mold 10 retains the second mold 9 and the lens frame 11.

The second mold 9 and the third mold 10 are formed by injection molding. Further, light-shielding resins as materials for the second mold 9 and the third mold 10 can be publicly-known light-shielding resins. Such resins to be used suitably are, for example, polyphthalamide and polyphenylene sulfide (PPS), and liquid crystal polymer (LCP, thermal expansion coefficient of 5E-5). Thus, the second mold 9 and the third mold 10 made from the light-shielding resins have thermal expansion coefficients higher than that of the lens frame 11, which is made from metal as described below.

The lens frame 11 is formed from metal in rectangular, flat-plate shape. The lens frame 11 has retaining holes for retaining the light-emitting lens 5 and the light-receiving lens 6. A suitable metallic material for the lens frame 11 is, but is not limited to, 42 alloy (thermal expansion coefficient of 5.5E-6), for example.

The lens frame 11 has through holes 11a at predetermined positions. Specifically, the through holes 11a are formed on a center line CL at positions closer to the terminals 4b so as to be symmetric with respect to a M-M line, which connects the center of the light-emitting lens 5 with the center of the light-receiving lens 6. The center line CL passes through a central point located midway between the light-emitting lens 5 and the light-receiving lens 6 in the direction orthogonal to the M-M line.

Meanwhile, the second mold 9 has fixing slots 9a at predetermined positions. Specifically, the fixing slots 9a are formed at positions (on the center line CL) matching (corresponding to) the through holes 11a, respectively, in such a state that the lens frame 11 is disposed on the second mold 9 at a predetermined position. In the fixing slots 9a and the through holes 11a, anchors 10a, which are parts of the third mold 10, are engaged.

For convenience of explanation, the fixing slot 9a shown in FIG. 1(b) is depicted so as to be located at the position in a cross-section that is taken along the M-M line shown in FIG. 1(a). In practice, the fixing slots 9a, however, are not located at the positions shown in FIG. 1(b).

Here, retaining structure of the lens frame 11 will be described.

Figure 3:
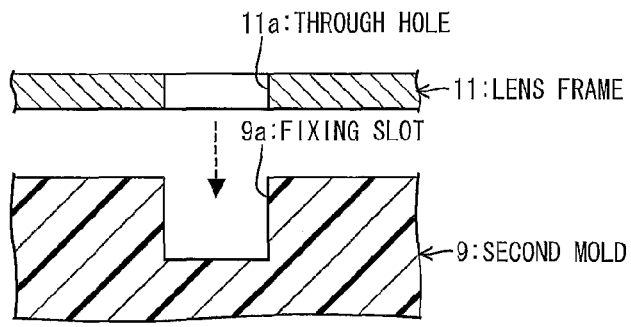
FIGS. 3(a) through 3(c) are cross-sectional views showing steps for obtaining a retaining structure in which a lens frame is fixed between a second mold and a third mold in the optical distance-measuring device.
FIG. 3(d) is a cross-sectional view showing another retaining structure that is different from the retaining structure of the lens frame obtained by the steps shown in FIGS. 3(a) through 3(c).
Figure 3:
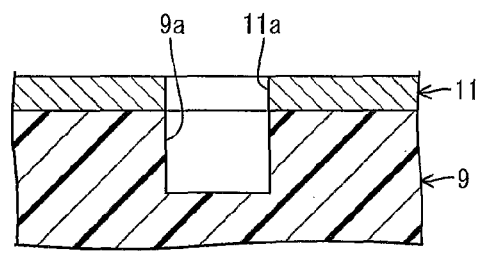
Figure 3:
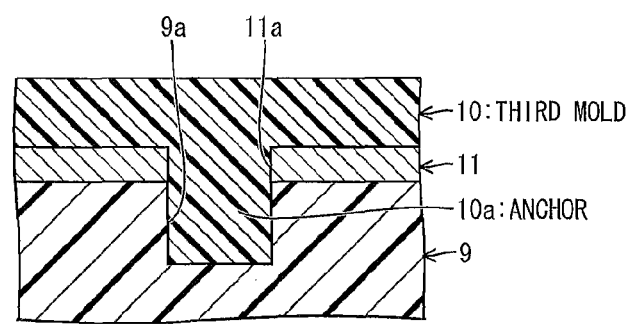
Figure 3:
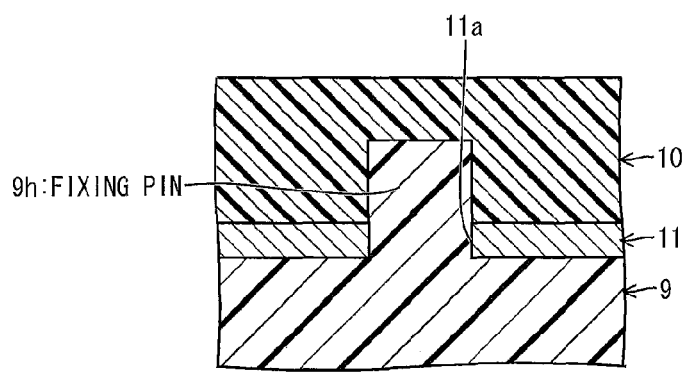

FIGS. 3(a) through 3(c) are cross-sectional views showing steps of holding the lens frame 11 between the second mold 9 and the third mold 10 to form the retaining structure (first retaining structure). Further, FIG. 3(d) is a cross-sectional view showing another retaining structure (second retaining structure) that is different from the first retaining structure.

The through hole 11a is aligned with the fixing slot 9a as shown in FIG. 3(a), and the lens frame 11 is then placed on the second mold 9 as shown in FIG. 3(b). In this state, the third mold 10 is formed by injection molding. Specifically, by injecting the light-shielding resin into a molding die in which the second mold 9 is placed, the third mold 10 is formed so as to cover the second mold 9, and the lens frame 11 is inserted as an inserting component between the second mold 9 and the third mold 10. In this case, as shown in FIG. 3(c), the light-shielding resin is filled in the fixing slot 9a and the through hole 11a, thereby forming the anchor 10a (projection) with no space. The anchor 10a passes through the through hole 11a and juts toward the second mold 9 from the lens frame 11. The jutting part of the anchor 10a connects the third mold 10 with the second mold 9. In this manner, the first retaining structure is obtained. In the first retaining structure, the third mold 10 is anchored to the second mold 9 with the anchor 10a, and the lens frame 11 is fixed so as to be sandwiched between the second mold 9 and the third mold 10.

As an alternative retaining structure that is different from the retaining structure obtained by the above arrangement, a retaining structure shown in FIG. 3(d) may be adopted.

In the retaining structure shown in FIG. 3(d), the second mold 9 has a fixing pin 9h (projection) passing through the through hole 11a of the lens frame 11, which connects the second mold 9 with the third mold 10. The fixing pin 9h is formed so as to project in a direction perpendicular to an upper surface of the second mold 9.

The above-described retaining structure is obtained in the following manner. First, the through hole 11a is aligned with the fixing pin 9h of the second mold 9, and the lens frame 11 is then placed on the second mold 9 so that the fixing pin 9h passes through the through hole 11a and juts from the lens frame 11. Next, in this state, the third mold 10 is formed by injection molding in the same manner as in the case of the first retaining structure. In this case, as shown in FIG. 3(d), the fixing pin 9h passes through the through hole 11a and juts from the lens frame 11. In this state, when the light-shielding resin for the third mold 10 is poured onto the lens frame 11, the light-shielding resin covers a jutting part of the projecting fixing pin 9h with no space. In this manner, the second retaining structure is obtained. In the second retaining structure, the third mold 10 is connected with the projecting fixing pin 9h, thereby being firmly fixed to the second mold 9. The lens frame 11 is fixed so as to be interposed between the second mold 9 and the third mold 10.

As described above, both of the first and second retaining structures are such that the second mold 9 is connected to the third mold 10 through the through hole 11a, thereby fixing the lens frame 11 between the second mold 9 and the third mold 10. For convenience sake, only such a retaining structure that the anchor 10a is formed in the fixing hole 9a will be given in the following description.

However, between the first retaining structure and the second retaining structure, how the lens frame 11 is fixed between the second mold 9 and the third mold 10 is different in the following point.

In the first retaining structure, the light-shielding resin poured into the fixing slot 9a and the through hole 11a with no space forms the anchor 10a when solidifies. Thus, in the first retaining structure, if the fixing slot 9a and the through hole 11a are correctly aligned with each other before the light-shielding resin is filled into the fixing slot 9a and the through hole 11a, it is possible to fix the lens frame 11 in the correct position between the second mold 9 and the third mold 10.

On the contrary, the second retaining structure requires a clearance for insertion of the fixing pin 9h between the fixing pin 9h and the through hole 11a. This requires the through hole 11a larger in diameter than the fixing pin 9h. In the second retaining structure, the clearance formed between the second mold 9 and the through hole 11a may cause displacement of the lens frame 11. In order to minimize the displacement, the diameter of the fixing pin 9h is set to be close to that of the through hole 11a to such an extent that the fixing pin 9h can pass through the through hole 11a.

Thus, when the clearance between the fixing pin 9h and the through hole 11a is set to be small, the light-shielding resin for the third mold 10 cannot run into the space owing to its viscosity. This makes it impossible to obtain an adhesion structure through the through hole 11a, which is a structure obtained by the first retaining structure. In view of this, the following approach is considered in forming the third mold 10. That is, the clearance between the fixing pin 9h and the through hole 11a is set to be large to such an extent that the light-shielding resin having viscosity can run into the clearance. However, this approach makes it difficult to perform high-accuracy alignment of the fixing pin 9h and the through hole 11a, which makes it difficult to minimize the displacement of the lens frame 11. Therefore, there is a trade-off between obtaining of the adhesion structure through the through hole 11a and high-accuracy alignment of the fixing pin 9h and the through hole 11a.

Thus, to securely fix the lens frame 11 between the second mold 9 and the third mold 10 with a high degree of accuracy, the first retaining structure is more preferable than the second retaining structure.

The fixing pin 9h, which passes through the through hole 11a, can be used as a fiducial for positioning the lens frame 11 on the second mold 9, as in the case with a positioning pin 9g (see FIGS. 10(a) and 10(b)) described later.

In the optical distance-measuring device 1 having the above-described configuration, the lens frame 11 made from metal retains the light-emitting lens 5 and the light-receiving lens 6. With this configuration, the lens frame 11 hardly expands even when the second mold 9 and the third mold 10 are thermally expanded due to ambient heat or self-heating of the light-emitting element 2 and the light-receiving element 3. Therefore, there is little difference between the amount of change in distance between the light-emitting lens 5 and the light-receiving lens 6 due to ambient heat and the amount of change in distance between the light-emitting lens 5 and the light-receiving lens 6 due to the self-heating. Thus, unlike the aforementioned distance-measuring device 600, it is possible to prevent decreased distance measurement accuracy without difference in the amount of change in distance between the lenses due to ambient heat and self-heating. Thus, with a simple structure, it is possible to prevent decreased distance measurement accuracy caused by ambient temperature changes and self-heating.

[Effect of Preventing Sliding of the Lens Frame]

The following will describe thermal expansion or contraction of the optical distance measuring device 1 when the optical distance measuring device 1 is placed in an atmosphere at high temperatures or in an atmosphere at low temperatures during reflow or the like process.

The second mold 9 and the third mold 10, both of which are made from the light-shielding resin, have thermal expansion coefficients higher than that of the lens frame 11 made from metal. This generates stresses at an interface between the lens frame 11 and the second mold 9 and at an interface between the lens frame 11 and the third mold 10 due to difference in thermal expansion coefficient. The stresses cause sliding between the lens frame 11 and the second mold 9 and sliding between the lens frame 11 and the third mold 10 when the degrees of stresses are higher than the degrees of adhesion between the lens frame 11 and the second mold 9 and adhesion between the lens frame 11 and the third mold 10.

However, since the anchor 10a of the third mold 10 penetrates through the lens frame 11 and is fit into the fixing slot 9a of the second mold 9, the lens frame 11 is fixed securely between the second mold 9 and the third mold 10. With this configuration, it is possible to suppress sliding between the lens frame 11 and the second mold 9 and sliding between the lens frame 11 and the third mold 10. Therefore, when the ambient temperatures return to room temperatures, there occurs no deviation from relative positions of the light-emitting element 2 and the light-receiving element 3 to the light-emitting lens 5 and the light-receiving lens 6.

When the optical distance-measuring device 1 expands (contracts) due to temperature changes, the amount of deformation of the lens frame 11 having a low thermal expansion coefficient is smaller than those of the second mold 9 and the third mold 10. This causes strains at the interface between the second mold 9 and the lens frame 11 and at the interface between the third mold 10 and the lens frame 11. The amount of strain increases with distance from the center of the optical distance-measuring device 1.

In the optical distance-measuring device 1, the two fixing slots 9a and two through holes 11a are arranged in symmetrical positions about a lens's center line passing through the centers of the light-emitting lens 5 and the light-receiving lens 6. With this arrangement, the lens frame 11 is fixed with the two anchors 10a in the spacing between the light-emitting lens 5 and the light-receiving lens 6, which suppresses sliding in the perimeter of the lens frame 11 where great strain occurs. Therefore, it is possible to keep the light-emitting element 2 and the light-receiving element 3 in relative position to the light-emitting lens 5 and the light-receiving lens 6. Thus, it is possible to facilitate the achievement of high heat resistance and high accuracy of the optical distance-measuring device 1.

Further, the optical distance-measuring device 1 is such that the two anchors 10a are arranged in symmetrical positions between the light-emitting lens 5 and light-receiving lens 6, as described above. This makes it possible to prevent the rotation of the lens frame 11 resulting from the sliding when uneven expansion (contraction) occurs with uneven ambient temperatures. In addition, stresses caused by temperature changes are scattered uniformly, which eliminates stress concentration to only one fixing slot 9a. This makes it possible to more effectively prevent the occurrence of sliding.

Therefore, the optical distance-measuring device 1 of the present embodiment is such that the light-emitting element 2 and the light-receiving element 3 are kept in relative position to the light-emitting lens 5 and the light-receiving lens 6 even in an atmosphere at high temperatures or in an atmosphere at low temperatures during reflow or the like process. This allows the optical distance-measuring device 1 to maintain a high distance measurement accuracy.

Further, in the above-described configuration, the second mold 9 is formed in such a shape that it is substantially symmetric with respect to the lens's center line. This causes uniform thermal expansion (contraction) and therefore makes stresses in balance work on the respective anchors 10a that are arranged in symmetrical positions with respect to the lens's center line. This makes it possible to effectively prevent the sliding of the lens frame 11.

Further, it is preferable that the above-described light-shielding resins for the second mold 9 and the third mold 10 are identical with each other. With this, the second mold 9 and the third mold 10 are of identical thermal expansion coefficients, and the degrees of expansion (contraction) at the interfaces become equal. This makes it possible to reduce strain/stress working on the lens frame 11. Therefore, it is possible to facilitate preventing the sliding of the lens frame 11.

As described previously, the light-shielding resins for the second mold 9 and the third mold 10 can be PPS, for example. The PPS has a thermal expansion coefficient of the order of 2E-5 in a direction of resin flow. The metal for the lens frame 11 may be copper or a copper alloy, for example. The thermal expansion coefficient of the copper or copper alloy is 1.7E-5, which is almost the same as (or substantially equal to) that of PPS. In this manner, the second mold 9, the third mold 10, and the lens frame 11 are formed from the materials whose thermal expansion coefficients are almost the same. With this, the second mold 9, the third mold 10, and the lens frame 11 thermally expand (contract) to almost the same degrees. Therefore, the lens frame 11 is less likely to slide from the second mold 9 and the third mold 10.

Even though the degree of thermal expansion (contraction) of the second mold 9 and the third mold 10 become almost the same as the degree of thermal expansion (contraction) of the lens frame 11 as described above, sliding between the lens frame 11 and the second mold 9 and sliding between the lens frame 11 and the third mold 10 are not completely eliminated. For example, as described previously, difference between sliding at the heating and sliding at the cooling due to difference between a temperature rise profile and a temperature drop profile causes displacements between the second mold 9 and the lens frame 11 and between the third mold 10 and the lens frame 11 after the cooling process. Therefore, even in such a case, as a matter of course, the anchor 10a is effective for stopping sliding between the second mold 9 and the lens frame 11 and sliding between the third mold 10 and the lens frame 11.

Further, when the lens frame 11 is formed from copper or a copper alloy having a high thermal expansion coefficient, changes in distance between the light-emitting lens and the light-receiving lens vary depending upon whether thermal expansion is caused by ambient heat or self-heating, as in the case with the conventional optical distance-measuring device wherein the light-emitting lens and the light-receiving lens are retained by a resin component. However, if it is necessary to give a higher priority to preventing sliding of the lens frame 11 during reflow by improving temperature characteristics (suppressing thermal expansion of the lens frame 11) to eliminate the distance variation, it is preferable to adopt the above configuration.

Modified Example 1

The following will describe modified examples of the present embodiment. FIGS. 4 through 7 are plan views showing the configurations of a substantial part of the optical distance-measuring device 1 according to modified examples of the present embodiment.

For convenience of explanation, the third mold 10 is not depicted in FIGS. 4 through 7.

<Configurations with Two Anchors>

Figure 4:
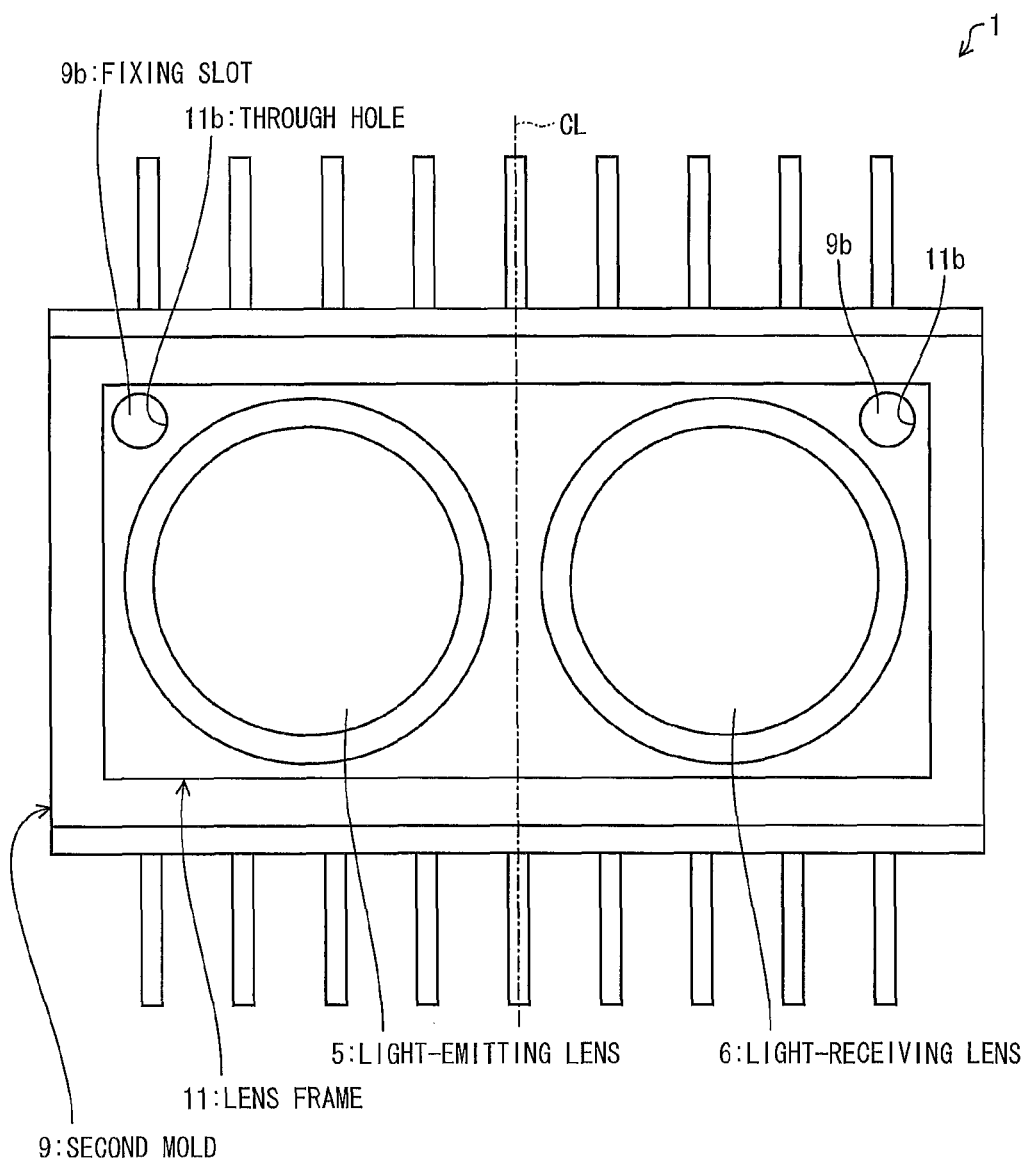
FIG. 4 is a plan view showing the configuration of a modified example of the First Embodiment where two fixing slots and two through holes are arranged on one of the long sides of the optical distance-measuring device.

As shown in FIG. 4, the optical distance-measuring device 1 according to the present modified example is such that the second mold 9 has two fixing slots 9b and the lens frame 11 has two through holes 11b.

The through holes 11b are respectively formed near two corners on one of the long sides of the lens frame 11. Further, the through holes 11b are arranged in symmetrical positions with respect to the center line CL.

The fixing slots 9b are formed in such a position that they match the through holes 11b in such a state that the lens frame 11 is arranged in a predetermined position on the second mold 9.

Figure 5:
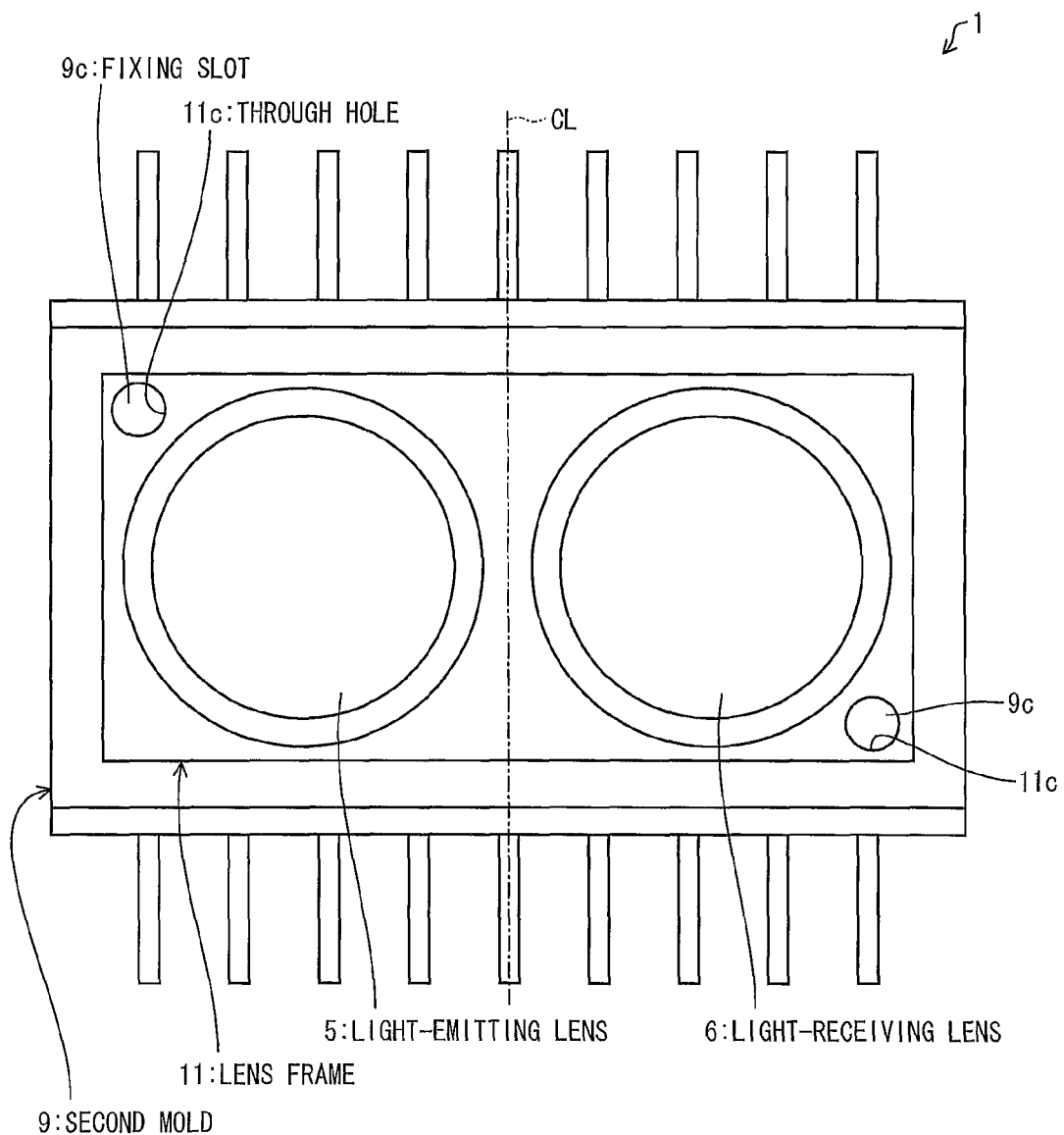
FIG. 5 is a plan view showing the configuration of a modified example of the First Embodiment where two fixing slots and two through holes are arranged at diagonal positions.

As shown in FIG. 5, another optical distance-measuring device 1 according to the present modified example is such that the second mold 9 has two fixing slots 9c and the lens frame 11 has two through holes 11c.

The through holes 11c are respectively formed near diagonal corners on the opposite long sides of the lens frame 11.

The fixing slots 9c are formed in such a position that they match the through holes 11c in such a state that the lens frame 11 is arranged in a predetermined position on the second mold 9.

In the above configuration, the anchors 10a are formed in the fixing slots 9b and the through holes 11b and in the fixing slots 9c and the through holes 11c. Specifically, the anchors 10a are arranged at positions corresponding to the fixing slots 9b and the through holes 11b and in the fixing slots 9c and the through holes 11c. With such a structure, a perimeter (edge) of the lens frame 11 is fixed where large distortion occurs when the second mold 9 and the third mold 10 expands (contracts) due to ambient temperature changes. Owing to this, the lens frame 11 does not slide aside from the second mold 9 and the third mold 10. In addition, since the lens frame 11 is fixed by the anchors 10a at corresponding two points, the lens frame 11 does not rotate even when uneven expansion occurs, as in the case with the configurations shown in FIGS. 1(a) and 1(b).

<Configurations with Four Anchors>

Figure 6:
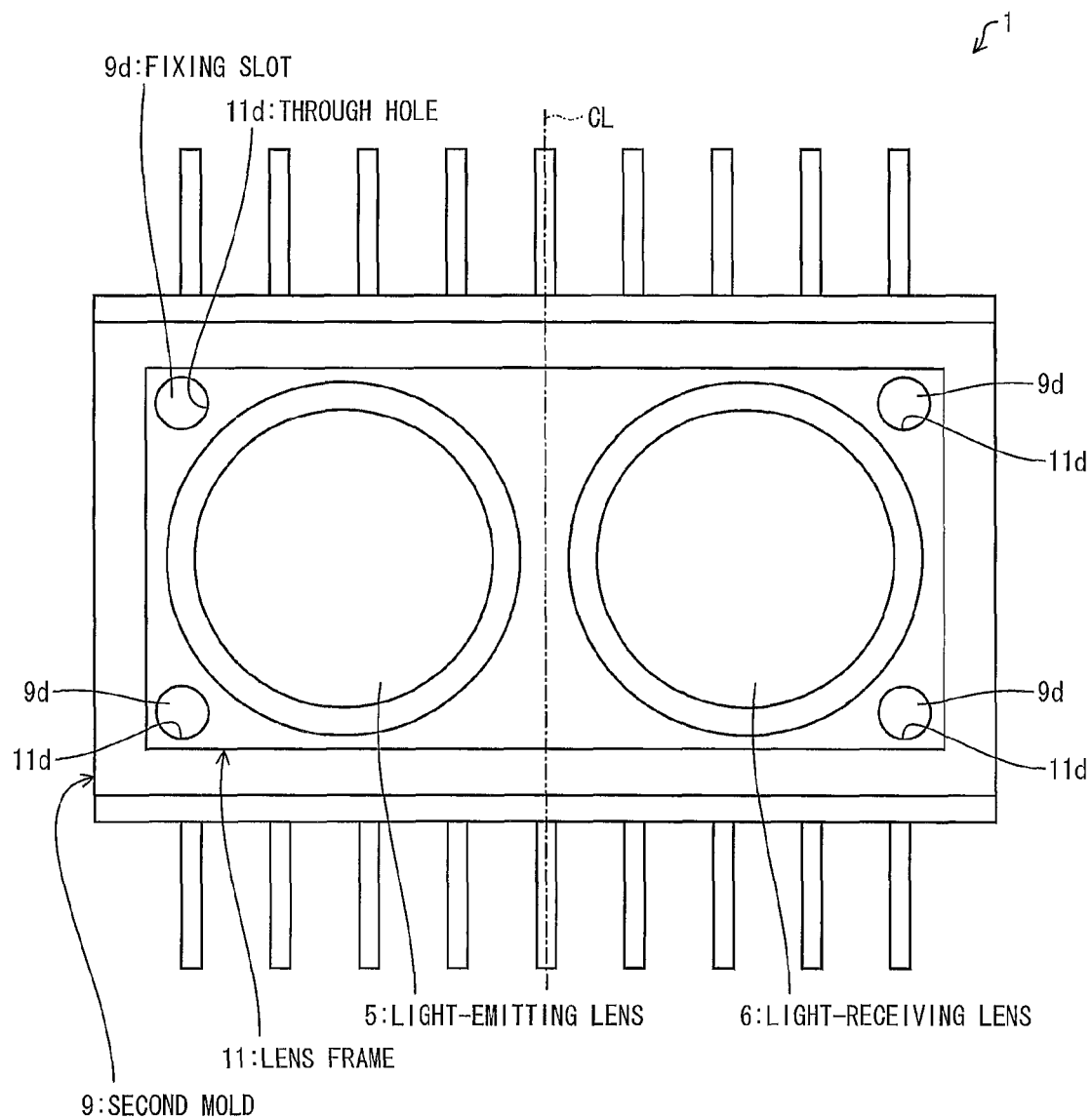
FIG. 6 is a plan view showing the configuration of a modified example of the First Embodiment where four fixing slots and four through holes are arranged.

As shown in FIG. 6, the optical distance-measuring device 1 according to the present modified example is such that the second mold 9 has four fixing slots 9d and the lens frame 11 has four through holes 11d.

The through holes 11d are respectively formed near four corners of the lens frame 11. Further, the through holes 11d located near the corners on the same long side of the lens frame 11 are arranged in symmetrical positions with respect to the center line CL.

The fixing slots 9d are formed in such a position that they match the through holes 11d in such a state that the lens frame 11 is arranged in a predetermined position on the second mold 9.

In the above configuration, the anchors 10a are formed in the fixing slots 9d and the through holes 11d. That is, the anchor 10a is arranged on every corner of the lens frame 11. This makes it possible to securely fix the lens frame 11 between the second mold 9 and the third mold 10.

<Configuration with Six Anchors>

Figure 7:
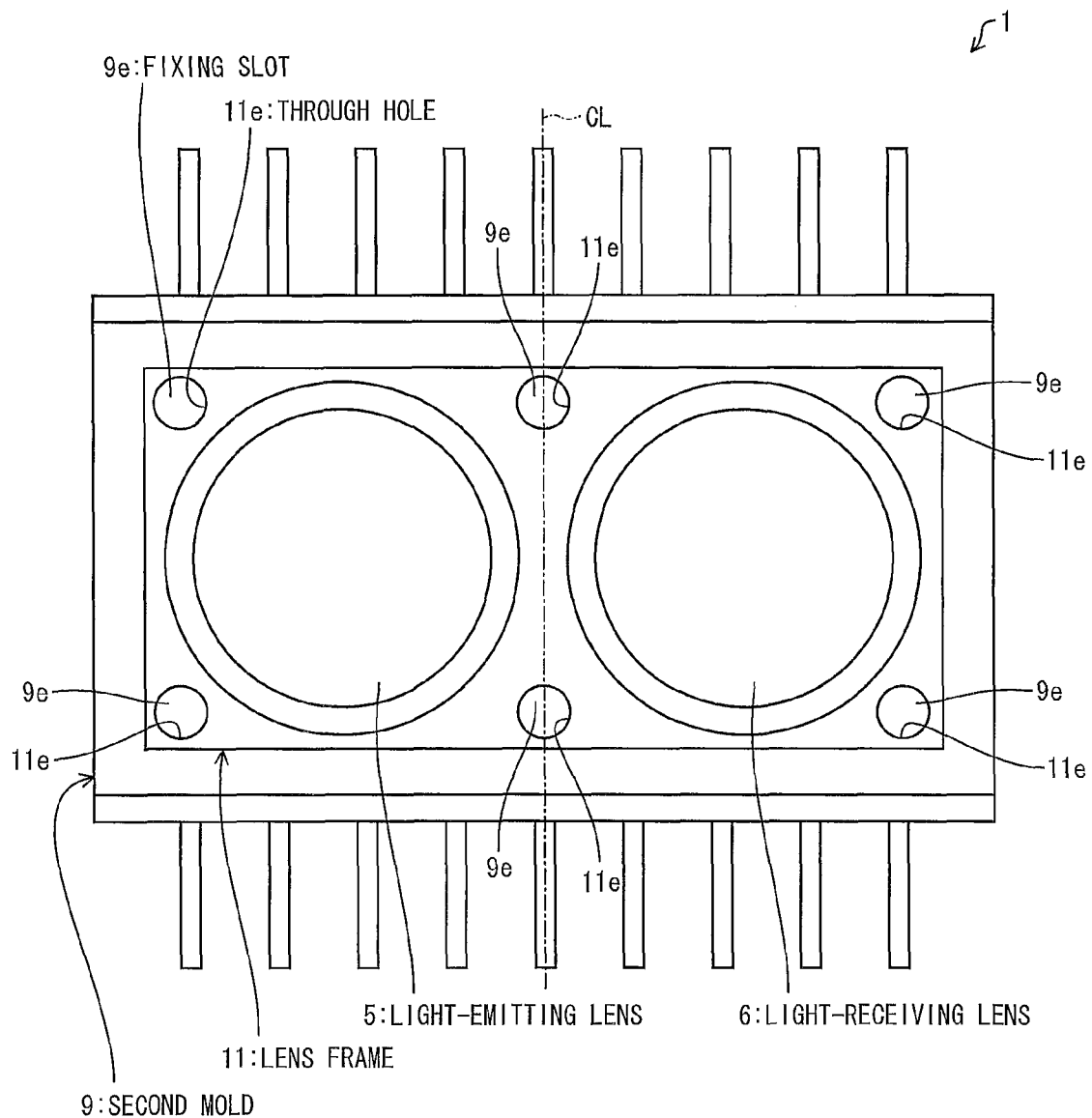
FIG. 7 is a plan view showing the configuration of a modified example of the First Embodiment where six fixing slots and six through holes are arranged.

As shown in FIG. 7, the optical distance-measuring device 1 according to the present modified example is such that the second mold 9 has six fixing slots 9e and the lens frame 11 has six through holes 11e.

The lens frame 11 has four out of the six through holes 11e respectively near four corners of the lens frame 11 and remaining two out of them on the center line CL that lies between the light-emitting lens 5 and the light-receiving lens 6. Further, the through holes 11e located at two corners on one long side of the lens frame 11 are arranged in symmetrical positions with respect to the center line CL.

The fixing slots 9e are formed in such a position that they match the through holes 11e in such a state that the lens frame 11 is arranged in a predetermined position on the second mold 9.

In the above configuration, the anchors 10a are formed in the fixing slots 9e and the through holes 11e. That is, the anchor 10a is arranged on every corner of the lens frame 11 and in an area between the light-emitting lens 5 and the light-receiving lens 6. This makes it possible to more securely fix the lens frame 11 between the second mold 9 and the third mold 10.

Modified Example 2

Figure 8:
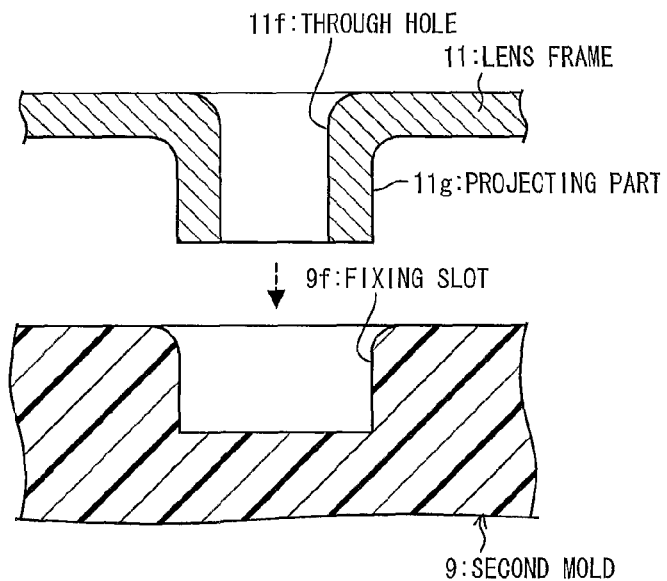
FIGS. 8(a) through 8(c) show a modified example of the First Embodiment and are views showing the steps of fixing the lens frame between the second mold and the third mold to form a retaining structure of the lens frame.
Figure 8:
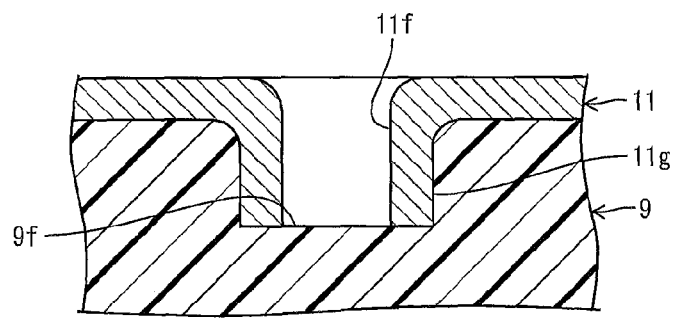
Figure 8:
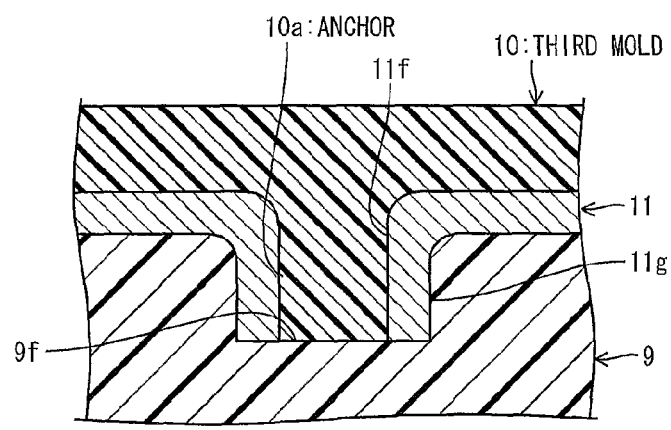
Figure 9:
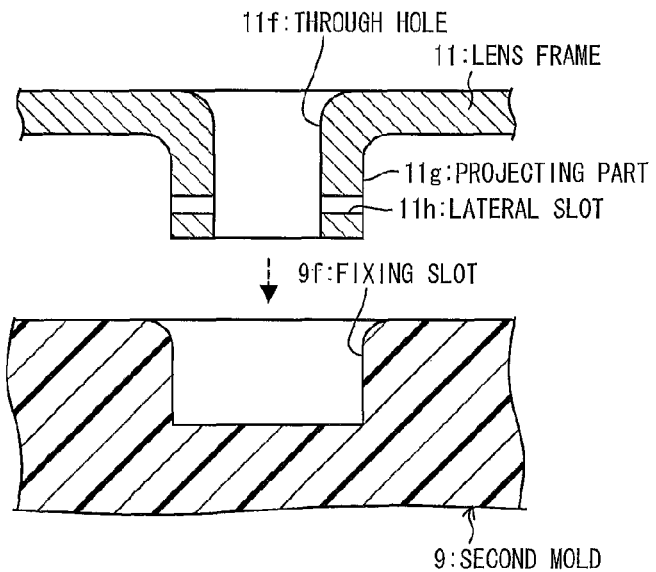
FIGS. 9(a) through 9(c) show a modified example of the First Embodiment and are views showing the steps of fixing the lens frame between the second mold and the third mold to form another retaining structure of the lens frame.
Figure 9:
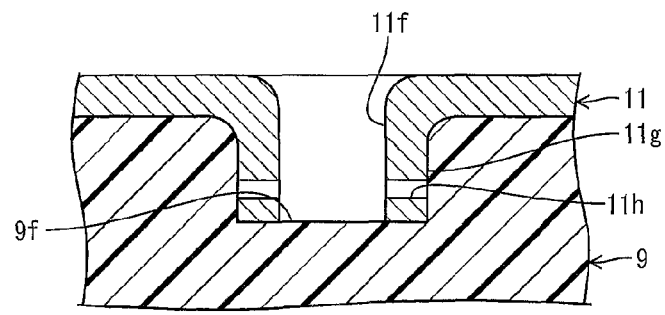
Figure 9:
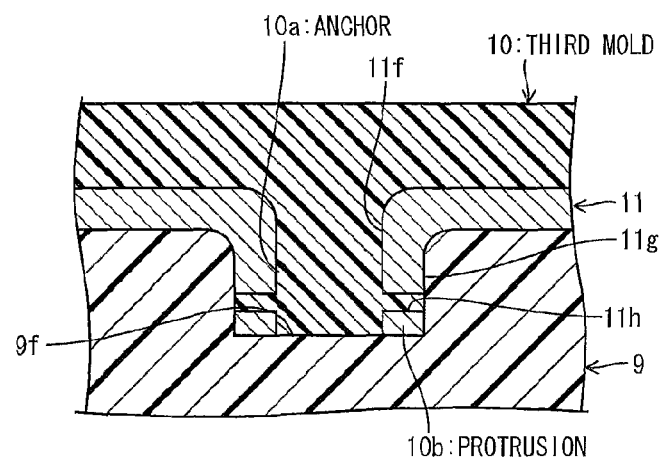

The following will describe another modified example of the present embodiment. FIGS. 8 and 9 are views showing a step of fixing the lens frame 11 between the second mold 9 and the third mold 10 to form the retaining structure of the lens frame 11.

<Configuration in which the Lens Frame has Anchors>

As shown in FIG. 8(a), the lens frame 11 has projections 11g, located in the positions corresponding to the through holes 11f, extending so as to project in a cylindrical manner in a direction perpendicular to the surface of the lens frame 11. The through holes 11f are formed inside the projecting part 11g so as to reach a lower end of the projecting part 11g. Meanwhile, the second mold 9 has fixing slots 9f formed in such a shape that the projections 11g are fit into the fixing slots 9f.

The projecting part 11g is aligned with the fixing slot 9g as shown in FIG. 8(a), and the lens frame 11 is placed on the second mold 9 with the projecting part 11g fit into the fixing slot 9f as shown in FIG. 8(b). In this state, the third mold 10 is formed by applying the light-shielding resin onto the lens frame 11 as shown in FIG. 8(c). In this case, the light-shielding resin is filled in the through hole 11f, thereby forming the anchor 10a. In this manner, the third mold 10 is anchored to the second mold 9 and the lens frame 11 with the anchor 10a. Therefore, the lens frame 11 is fixed so as to be sandwiched between the second mold 9 and the third mold 10.

In the above configuration, as shown in FIG. 8(c), not only the anchor 10a but also the projecting part 11g of the lens frame 11 made from metal are fit into the fixing slot 9f of the second mold 9. With this, the metallic anchor, i.e. the projecting part 11g is hit into the second mold 9 perpendicularly to the direction of the surface of the lens frame 11 where sliding occurs. Therefore, it is possible to more securely fix the lens frame 11 between the second mold 9 and the third mold 10, as compared with the configuration where the lens frame 11 is fixed with only the anchors 10a made from the light-shielding resin. Thus, it is possible to more reliably prevent sliding between the lens frame 11 and the second mold 9 and sliding between the lens frame 11 and the third mold 10.

Further, in the manufacturing process of the optical distance-measuring device 1, the projecting part 11g that can be fit into the fixing slot 9f functions as a positioning mark in placing the lens frame 11 on the second mold 9. This makes it possible to facilitate the positioning of the lens frame 11 and to thus facilitate the manufacture of the optical distance-measuring device 1.

<Configuration with a Function of Preventing the Lens Frame from being Peeled Off>

As shown in FIG. 9(a), the lens frame 11 has projections 11g, as in the configuration shown in FIG. 8(a). The projecting part 11g has lateral slots 11h (holes) penetrating in a direction parallel to the surface of the lens frame 11. Meanwhile, the second mold 9 has the fixing slots 9f, as in the configuration shown in FIG. 8(a).

The projecting part 11g is aligned with the fixing slot 9f as shown in FIG. 9(a), and the lens frame 11 is placed on the second mold 9 with the projecting part 11g fit into the fixing slot 9f as shown in FIG. 9(b). In this state, the third mold 10 is formed by applying the light-shielding resin onto the lens frame 11 as shown in FIG. 9(c). In this case, the light-shielding resin is filled in the through hole 11f and the lateral slots 11h, thereby forming the anchor 10a having a protrusion 10b. In this manner, the third mold 10 is anchored to the second mold 9 and the lens frame 11 with the anchor 10a. Therefore, the lens frame 11 is fixed so as to be sandwiched between the second mold 9 and the third mold 10.

In the above configuration, as shown in FIG. 9(c), the metallic anchor, i.e. the projecting part 11g is hit into the second mold 9 perpendicularly to the direction of the surface of the lens frame 11 where sliding occurs, as in the configuration shown in FIG. 8(b). Thus, it is possible to more reliably prevent sliding between the lens frame 11 and the second mold 9 and sliding between the lens frame 11 and the third mold 10.

In addition, the second mold 9 and the lens frame 11 are also fixed with protrusions 10b. This makes it possible to resist stresses working in the direction perpendicular to the direction of the surface of the lens frame 11. Thus, it is possible to prevent the lens frame 11 from being peeled off due to the stresses.

Second Embodiment

The following will describe another embodiment of the present invention with reference to FIGS. 10(a), 10(b), 11, and 12(a) through 12(f).

In the present embodiment, the constituent elements having the same functions as those described in the First Embodiment are given the same reference numerals and explanations thereof are omitted here.

[Configuration of the Optical Distance-Measuring Device]

Figure 10:
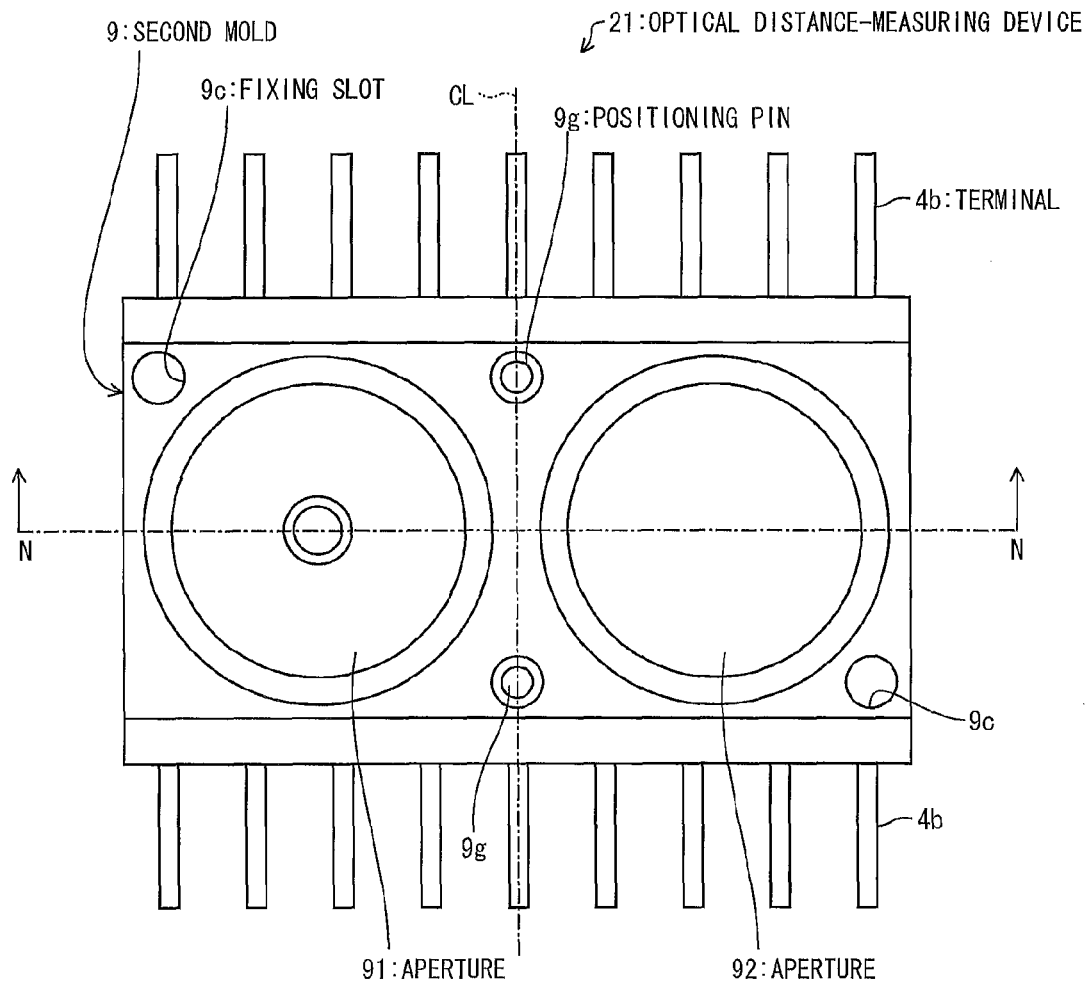
FIG. 10(a) is a plan view showing the configuration of an optical distance-measuring device according to Second Embodiment of the present invention.
FIG. 10(b) is a cross-sectional view taken along an N-N line shown in the plan view of FIG. 10(a).
Figure 10:
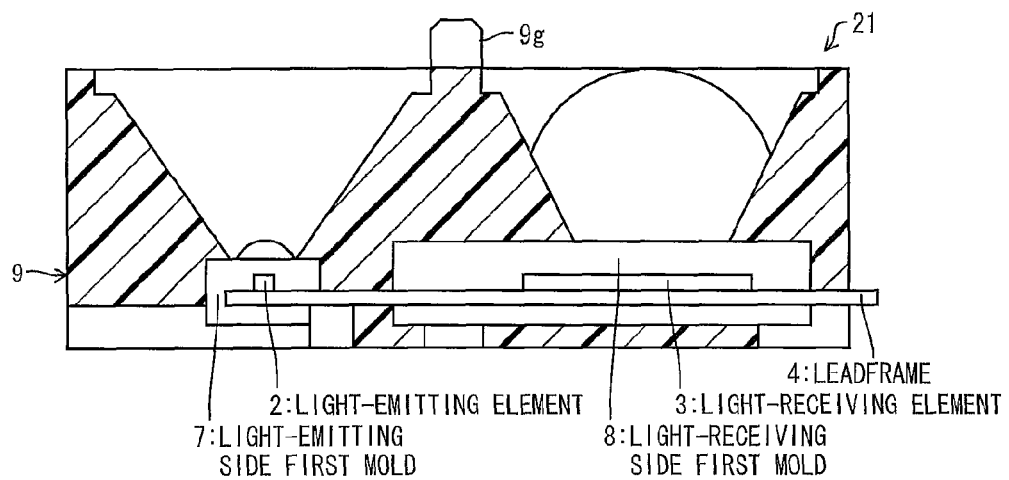
Figure 11:
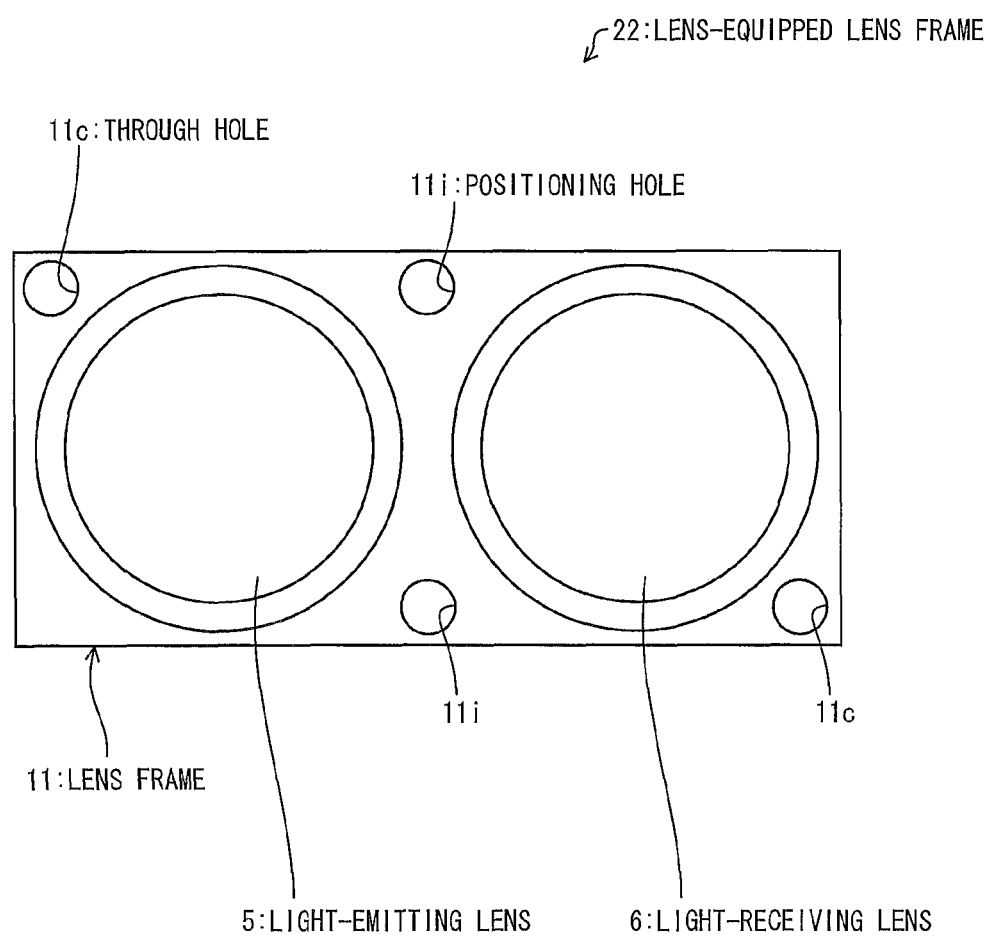
FIG. 11 is a plan view showing the configuration of a lens-equipped lens frame provided in the optical distance-measuring device shown in FIG. 10.

FIGS. 10(a) and 10(b) are a plan view and a cross-sectional view, respectively, showing the configuration of an optical distance-measuring device 21 according to another embodiment of the present invention. FIG. 11 is a plan view showing the configuration of a lens-equipped lens frame 22 in the optical distance-measuring device 21.

For convenience of explanation, the third mold 10 is not depicted in FIGS. 10(a) and 10(b).

As shown in FIGS. 10(a) and 10(b), the optical distance-measuring device 21, as with the optical distance-measuring device 1, includes a light-emitting element 2, a light-receiving element 3, a leadframe 4, a light-emitting lens 5, a light-receiving lens 6, a light-emitting side first mold 7, a light-receiving side first mold 8, and a second mold 9. Further, the optical distance-measuring device 21 includes a third mold 10, which is not depicted in FIGS. 10(a) and 10(b). Still further, the optical distance-measuring device 21 includes the lens-equipped lens frame 22 shown in FIG. 11.

As with the aforementioned second mold 9 shown in FIG. 5, the second mold 9 has two fixing slots 9c. In addition, the second mold 9 has two positioning pins 9g.

Note that the fixing slots of the second mold 9 are not limited to the fixing slots 9c. Alternatively, the second mold 9 may have the fixing slots 9b shown in FIG. 4 or the fixing slots 9d shown in FIG. 6.

The positioning pins 9g are formed so as to project in a direction perpendicular to an upper surface of the second mold 9. Each of the positioning pins 9g has a tapered face at the free end to facilitate insertion of the positioning pins 9g into positioning holes 11i. Further, the positioning pins 9g are arranged on a center line CL, which lies between an aperture 91 where the light-emitting lens 5 is to be disposed and an aperture 92 where the light-receiving lens 6 is to be disposed, at positions closer to the terminals 4b so as to be symmetric with respect to a N-N line (lens's center line).

As shown in FIG. 11, the lens-equipped lens frame 22 is configured such that the light-emitting lens 5 and the light-receiving lens 6 are retained by the lens frame 11. As with the lens frame 11 shown in FIG. 5, the lens frame 11 has two through holes 11c. The lens frame 11 further has two positioning holes 11i.

Note that the through holes of the lens frame 11 are not limited to the through holes 11c. Alternatively, the lens frame 11 may have the through holes 11b show in FIG. 4 or the through holes 11d shown in FIG. 6.

The positioning holes 11i are arranged in such size and position that the positioning pins 9g are fit thereinto in a state that the lens frame 11 is placed at a predetermined position on the second mold 9. Further, the positioning holes 11i are arranged at positions closer to two long sides of the lens frame 11 in a spacing between the light-emitting lens 5 and the light-receiving lens 6.

In the above configuration, the second mold 9 has the positioning pins 9g. Therefore, in the manufacturing process of the optical distance-measuring device 21, it is possible to achieve the positioning of the lens frame 11 by inserting the positioning pins 9g into the positioning holes 11i. This makes it possible to facilitate the positioning of the lens frame 11 and to thus facilitate the manufacture of the optical distance-measuring device 21.

The positioning pins 9g require a given strength to prevent damage when they are inserted into the positioning holes 11i, and the positioning pin 9g thus requires a diameter that is equal to or more than a predetermined diameter. For this reason, as shown in FIG. 10(a), the positioning pins 9g having adequate strength are located on the upper surface of the second mold 9 in a relatively large area located between the apertures 91 and 92. Meanwhile, in order to form the anchors 10a, the fixing slots 9c are arranged at positions close to the respective one ends of two short sides where the terminals 4b are not provided rather than in the central area of the second mold 9.

The positioning pins 9g are formed so as to have adequate strength, as described above. Therefore, as with the anchors 10a, the positioning pins 9g, when anchored to the lens frame 11, can contribute to preventing sliding between the second mold 9 and the lens frame 11 and sliding between the third mold 10 and the lens frame 11. Furthermore, the positioning pins 9g (projections), as with the aforementioned fixing pins 9h shown in FIG. 3(d), are connected with the third mold 10 formed by injection molding, and the positioning pins 9g thus have much the same retaining effect of the lens frame 11 as the fixing pins 9h.

Note that in a state where the positioning pin 9g is inserted into the positioning hole 11i, clearance is provided between the positioning pin 9g and the positioning hole 11i. The clearance is provided to facilitate insertion of the positioning pin 9g into the positioning hole 11i. However, owing to the clearance, slight displacement occurs between the second mold 9 and the lens frame 11 and between the third mold 10 and the lens frame 11. In view of this, in order to minimize deviation from relative positions of the light-emitting element 2 and the light-receiving element 3 to the light-emitting lens 5 and the light-receiving lens 6, it is preferable to use the anchors 10a that are formed by filling the light-shielding resin into the fixing slots 9c and the through holes 11c with no space between them.

[Manufacture of the Optical Distance-Measuring Device]

The following will describe procedural steps of the manufacture of the optical distance-measuring device 21. FIGS. 12(a) through 12(f) are cross-sectional views showing steps for the manufacture of the optical distance-measuring device 21.

Figure 12:
FIGS. 12(a) through 12(f) are cross-sectional views showing the steps for manufacturing the optical distance-measuring device shown in FIG. 10.
Figure 12:
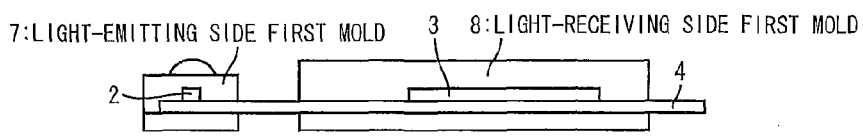
Figure 12:
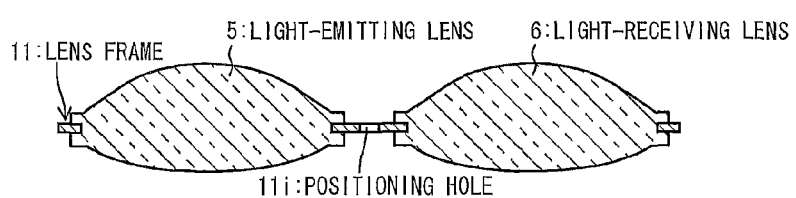
Figure 12:
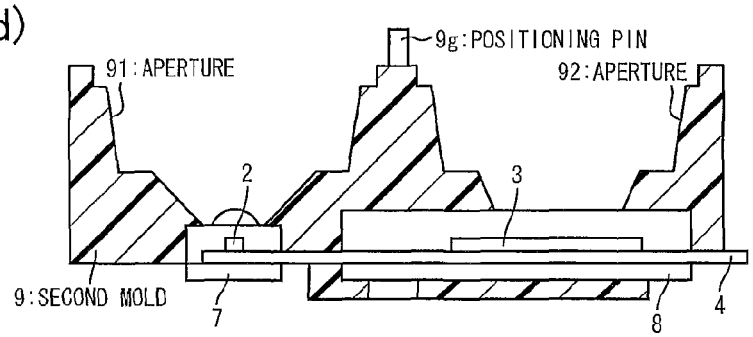
Figure 12:
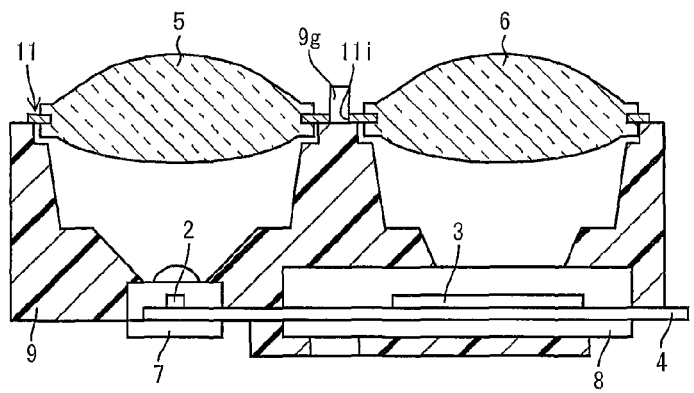
Figure 12:
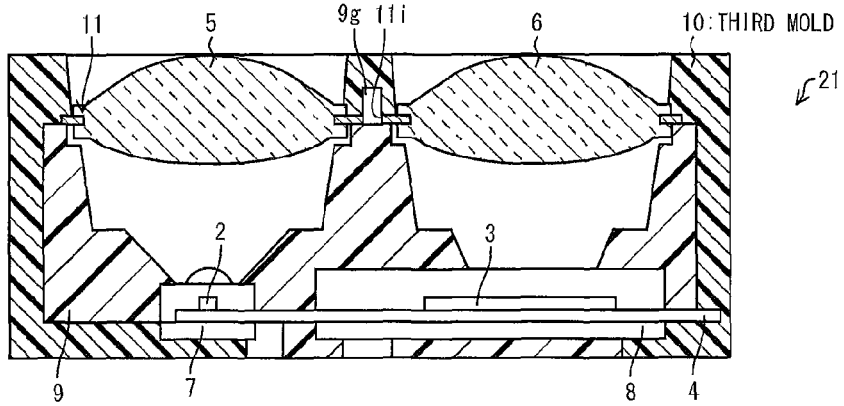

For convenience of explanation, the positioning holes 11i shown in FIGS. 12(d) through 12(f) are depicted so as to be located at the positions in a cross-section that is taken along the lens's center line (N-N line shown in FIG. 10(a)). In practice, the positioning holes 11i, however, are not located at the positions shown in drawings.

First, as shown in FIG. 12(a), the light-emitting element and the light-receiving element 3 are placed on the leadframe 4. In this state, by using Au wires (not shown), electrical connections are made between the light-emitting element 2 and the terminals 4b and between the light-receiving element 3 and the terminals 4b.

Next, as shown in FIG. 12(b), the light-emitting side first mold 7 is formed by sealing the light-emitting element 2 with the light-transmitting resin. At the same time, the light-receiving side first mold 8 is formed by sealing the light-receiving element 3 with the light-transmitting resin.

Separately from the above step, as shown in FIG. 12(c), the light-emitting lens 5 and the light-receiving lens 6 are formed from the light-transmitting resin on the lens frame 11. Through the lens frame 11, the positioning holes 11i are formed in advance at positions corresponding to the positioning pins 9g, respectively.

Thereafter, as shown in FIG. 12(d), the second mold 9 is formed from the light-shielding resin. In this case, the positioning pins 9g are formed on the upper surface of the second mold 9 in the area between the apertures 91 and 92.

Further, as shown in FIG. 12(e), the positioning pins 9g are inserted into the positioning holes 11i, thereby placing the lens frame 11 on the second mold 9.

Finally, as shown in FIG. 12(f), third mold 10 is formed from the light-shielding resin, thereby completing the optical distance-measuring device 21.

The optical distance-measuring device 1 according to the First Embodiment can also be manufactured in much the same way as the above-described steps. In this case, the step of positioning the lens frame 11 with the positioning pins 9g is omitted since the optical distance-measuring device 1 has no positioning pins 9g. However, the optical distance-measuring device 1 may be configured such that the second mold 9 has positioning pins like the positioning pins 9g, and that the lens frame 11 has positioning holes like the positioning holes 11i. With this configuration, it is possible to carry out the step of positioning the lens frame 11, as shown in FIG. 12(e). In this case, it is preferable that the positioning pins and the positioning holes are provided in the configurations, shown in FIGS. 4, 5, and 6, where the area between the light-emitting lens 5 and the light-receiving lens 6 is not used for formation of the anchors 10a.

Third Embodiment

Figure 13:
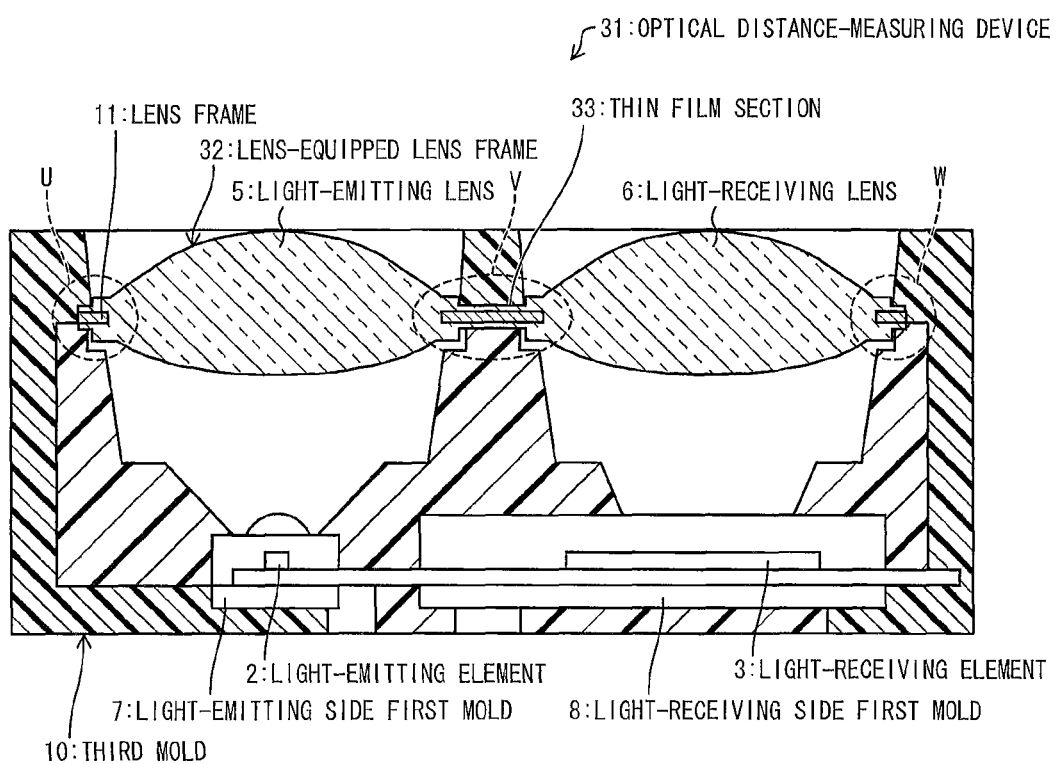
FIG. 13 is a cross-sectional view showing the configuration of an optical distance-measuring device according to Third Embodiment of the present invention.
Figure 14:
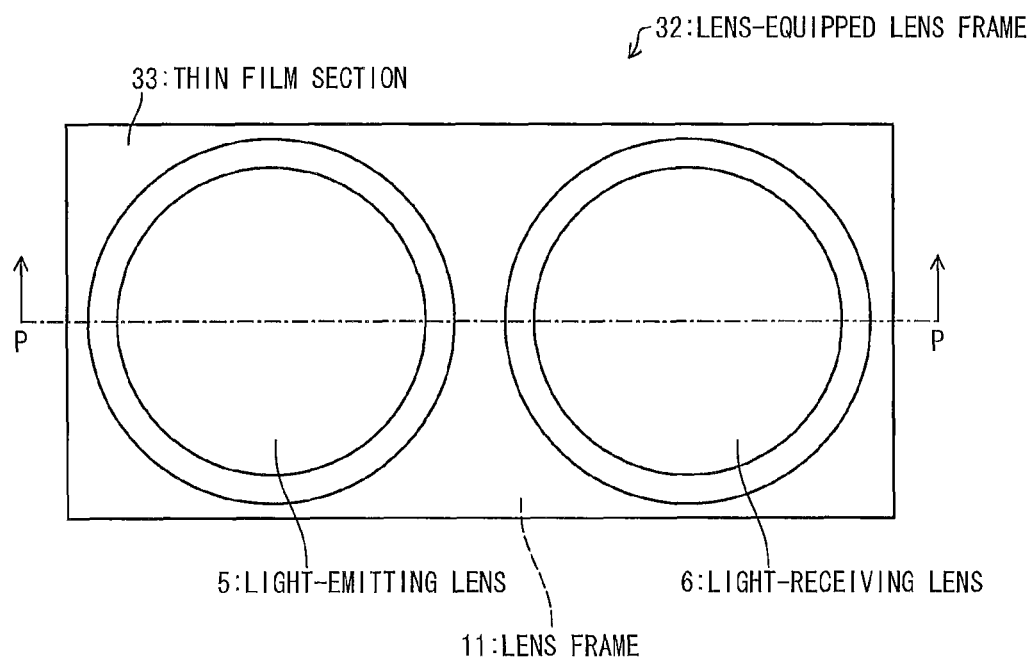
FIG. 14(a) is a plan view showing the configuration of a lens-equipped lens frame in the optical distance-measuring device shown in FIG. 13.
FIG. 14(b) is a cross-sectional view taken along a P-P line shown in the plan view of FIG. 14(a).
Figure 14:
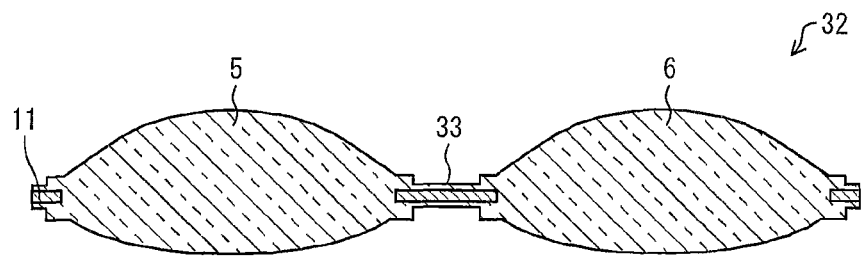

The following will describe still another embodiment of the present invention with reference to FIGS. 13, 14(a), and 14(b).

In the present embodiment, the constituent elements having the same functions as those described in the First Embodiment are given the same reference numerals and explanations thereof are omitted here.

[Configuration of the Optical Distance-Measuring Device]

FIG. 13 is a cross-sectional view showing the configuration of an optical distance-measuring device 31 according to still another embodiment. FIGS. 14(a) and 14(b) are a plan view and a cross-sectional view, respectively, showing the configuration of a lens-equipped lens frame 32 in the optical distance-measuring device 31.

For convenience of explanation, no through holes are depicted in FIG. 14(a).

As shown in FIG. 13, the optical distance-measuring device 31, as with the optical distance-measuring device 1, includes a light-emitting element 2, a light-receiving element 3, a leadframe 4, a light-emitting side first mold 7, a light-receiving side first mold 8, a second mold 9, and a third mold 10. In addition, the optical distance-measuring device 31 includes a lens-equipped lens frame 32.

As shown in FIGS. 14(a) and 14(b), the lens-equipped lens frame 32 has a thin film section 33. The thin film section 33 is formed on a front furface and/or a back surface of the lens frame 11 in areas other than areas where the light-emitting lens 5 and the light-receiving lens 6 are attached to the lens frame 11. Also, the thin film section 33 is integrally formed from the same resin as those for the light-emitting lens 5 and the light-receiving lens 6.

In the optical distance-measuring device 31 configured as described above, the lens frame 11 of the lens-equipped lens frame 32 is coated with the thin film section 33. This avoids the lens frame 11 from coming into contact with the second mold 9 and the third mold 10. With this arrangement, there occur resin-to-resin contacts between the lens-equipped lens frame 32 and the second mold 9 and between the lens-equipped lens frame 32 and the third mold 10 in a letter-U section, a letter-V section, and a letter-W section all shown by broken lines in FIG. 13. This enhances adhesiveness. Therefore, it is possible to further reduce the occurrence of sliding, as compared with the configuration where the lens frame 11 comes into contact with the second mold 9 and the third mold 10.

For example, the occurrence of sliding between the third mold 10 and the light-emitting lens 5 in the letter-U section which is an outer edge of the third mold 10 requires the occurrence of sliding in the letter-V section which is a center part of the third mold 10 and the occurrence of sliding in the letter-W section which is an opposing outer edge of the third mold 10. This means that no sliding occurs unless enormous stress works. Thus, a great effect of preventing the occurrence of sliding can be expected.

Note that the thin film section 33 formed on the lower surface side of the lens frame 11 in the letter-V section, depending upon its thickness, can be a direct light-guiding path of light emitted from the light-emitting element 2 to the light-receiving element 3 side. Therefore, with regard to the thin film section 33, it is preferable that the thin film section 33 is designed to be thin enough to prevent the entry of light and that the thin film section 33 takes a thin-film structure like a maze of light inside the thin film section 33.

Further, in the above configuration, the thin film section 33 is integrally formed from the resin that is identical with the resin used to form the light-emitting lens 5 and the light-receiving lens 6. With this arrangement, it is possible to form the thin film section 33 simultaneously with the formation of the light-emitting lens 5 and the light-receiving lens 6 on the lens frame 11. Therefore, it is possible to form the thin film section 33 with ease.

Fourth Embodiment

Figure 15:
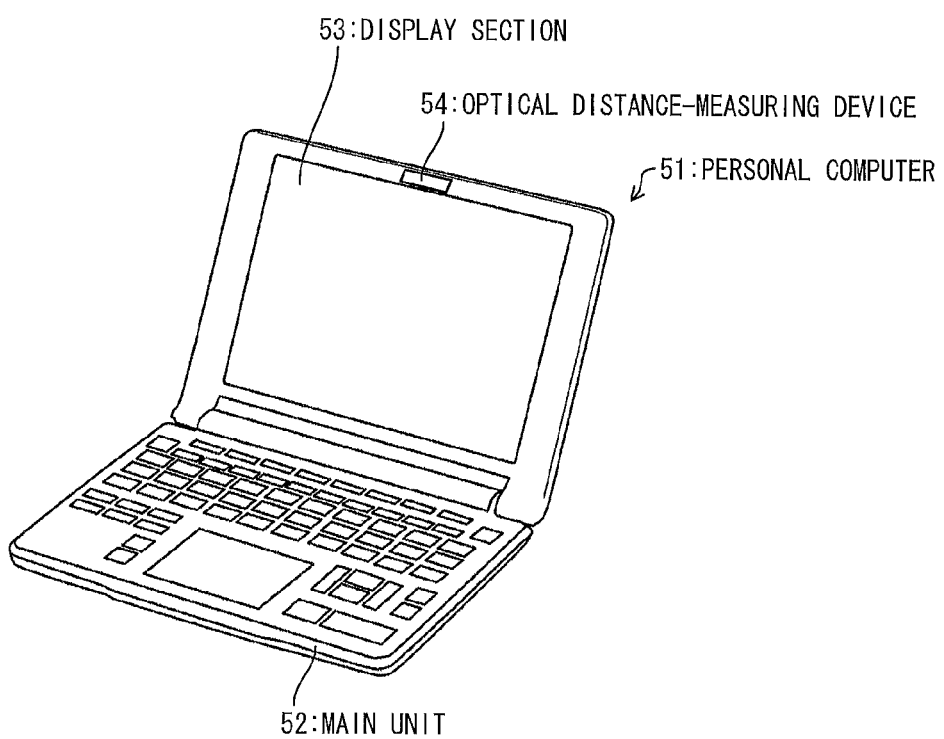
FIG. 15 is a perspective view showing the configuration of a personal computer according to Fourth Embodiment of the present invention.

The following will describe yet another embodiment according to the present invention with reference to FIG. 15.

FIG. 15 is a perspective view showing a personal computer 51 as an electronic device.

As shown in FIG. 15, the personal computer 51 has a main unit 52 and a display section 53. At an upper part of a rim of the display section 53, an optical distance-measuring device 54 is provided. As the optical distance-measuring device 54 used is any one of the aforementioned optical distance-measuring devices 1, 21, 31 with high heat resistance and high performance.

The personal computer 51 is able to accurately detect the presence or absence of a person in front of the personal computer by means of the optical distance-measuring device 54. This allows the personal computer 51 to change its operation mode to a sleep mode when the person goes away from the front of the personal computer 51, thus efficiently saving energy.

Further, the optical distance-measuring device 54, which is a high-performance device with high heat resistance, can be readily mounted in large quantities on substrates in a short time through reflow.

An electronic device which can be equipped with the optical distance-measuring device 54 is not limited to the personal computer 51. For example, the optical distance-measuring device 54 can be used for non-contact operation. Specifically, for home electric appliances used in a kitchen and sanitary apparatuses, the optical distance-measuring device 54 can be used as a non-contact switch with which their operations are switched on and off without contact therewith. In addition, the optical distance-measuring device 54 can be used for operations of electronic devices, e.g. detecting a distance to user's hands to perform volume control when the user's hands are wet or dirty.

Comparative Example

Figure 16:
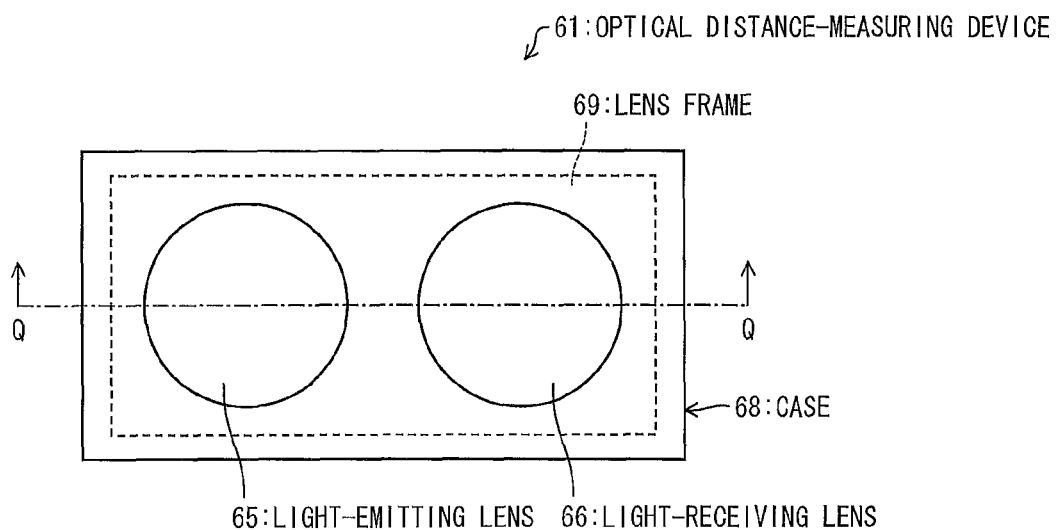
FIG. 16(a) is a plan view showing the configuration of an optical distance-measuring device according to Comparative Example of the embodiments of the present invention.
FIG. 16(b) is a cross-sectional view taken along a Q-Q line shown in the plan view of FIG. 16(a).
Figure 16:
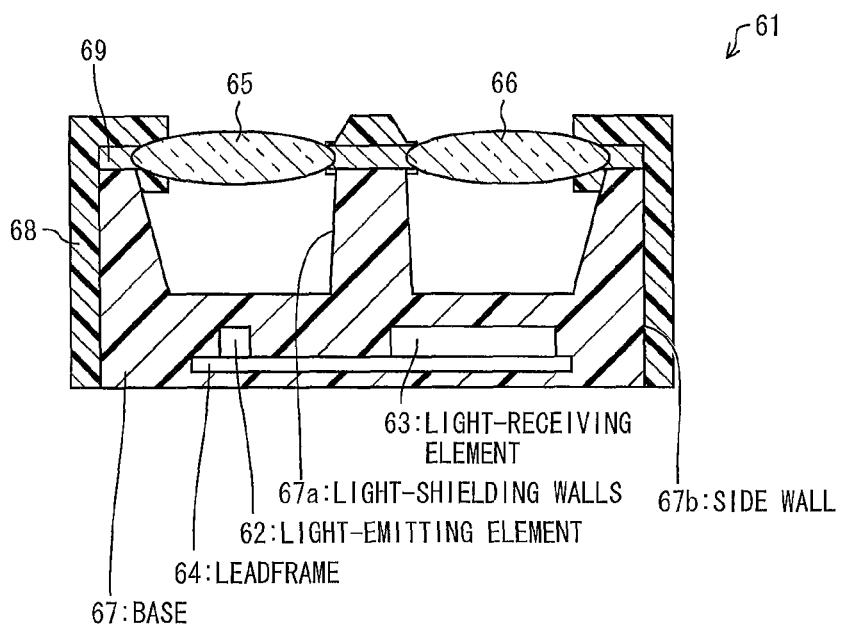
Figure 17:
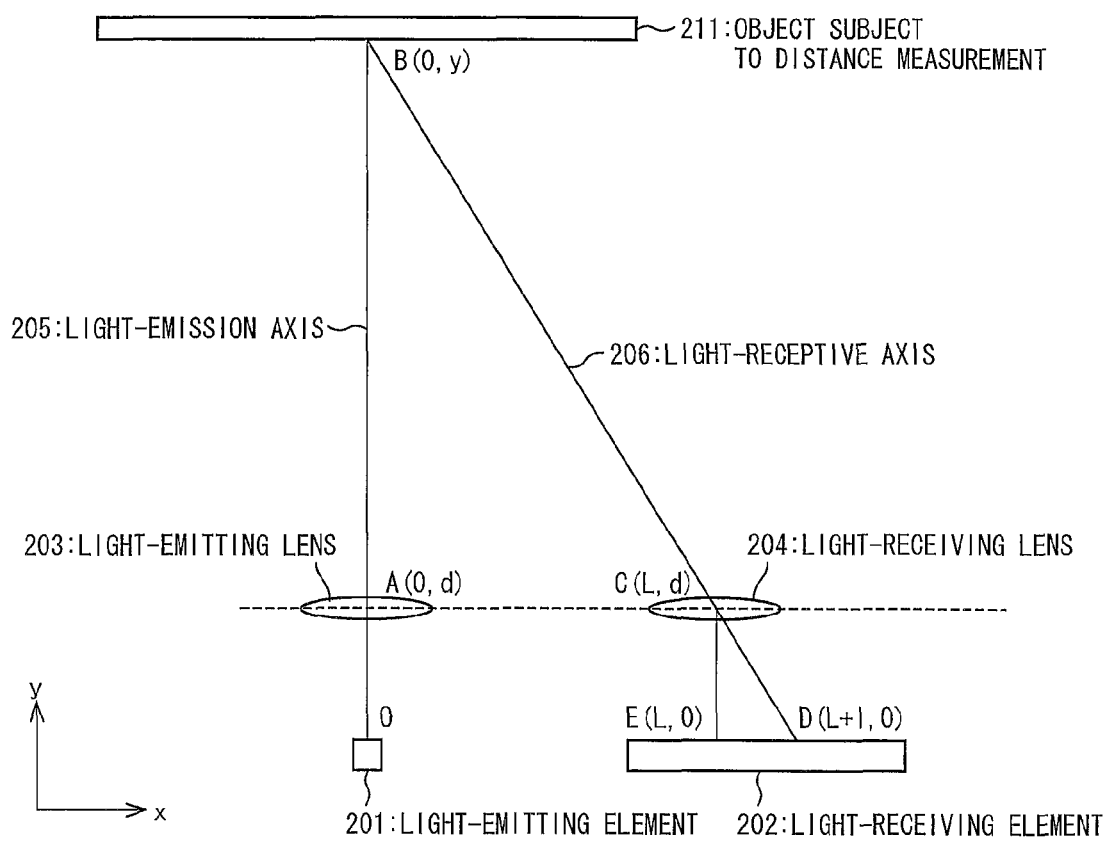
FIG. 17 is an explanatory view of the principle of a typical triangulation method.
Figure 18:
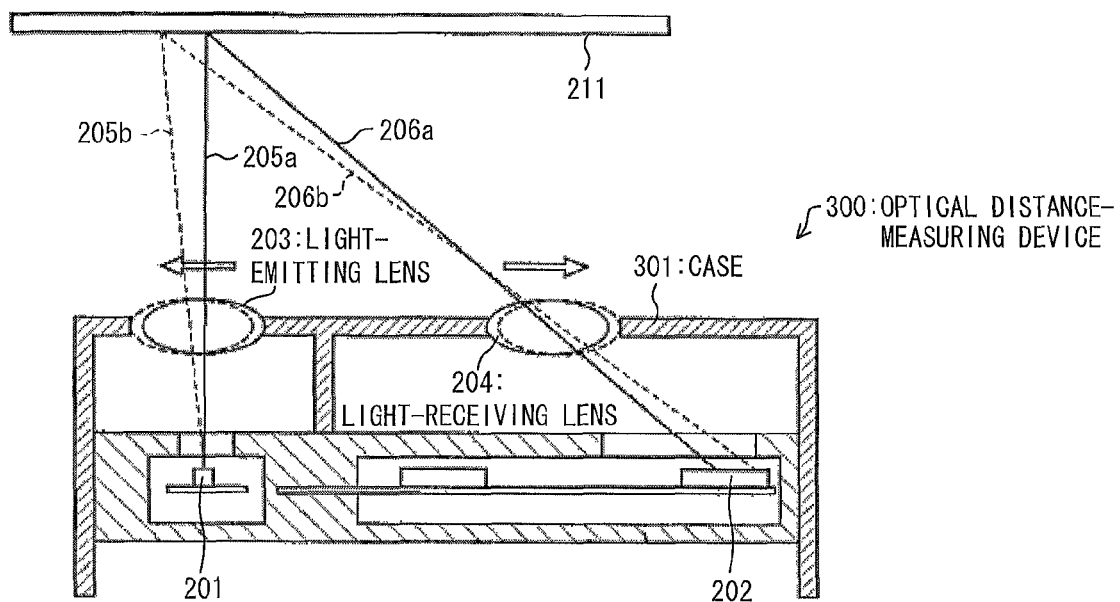
FIG. 18 is a cross-sectional view showing the configuration of a typical distance-measuring device.
Figure 19:
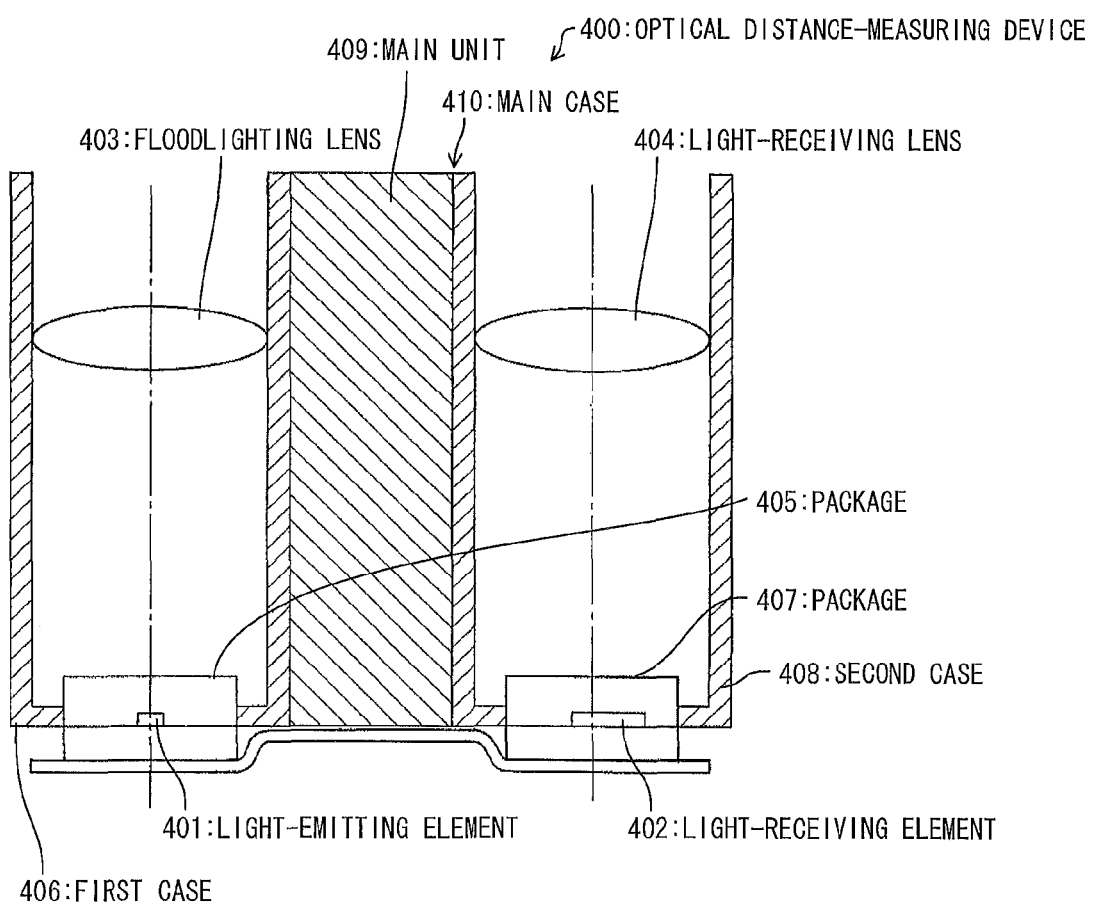
FIG. 19 is a cross-sectional view showing the configuration of a distance-measuring device described in Patent Literature 1.
Figure 20:
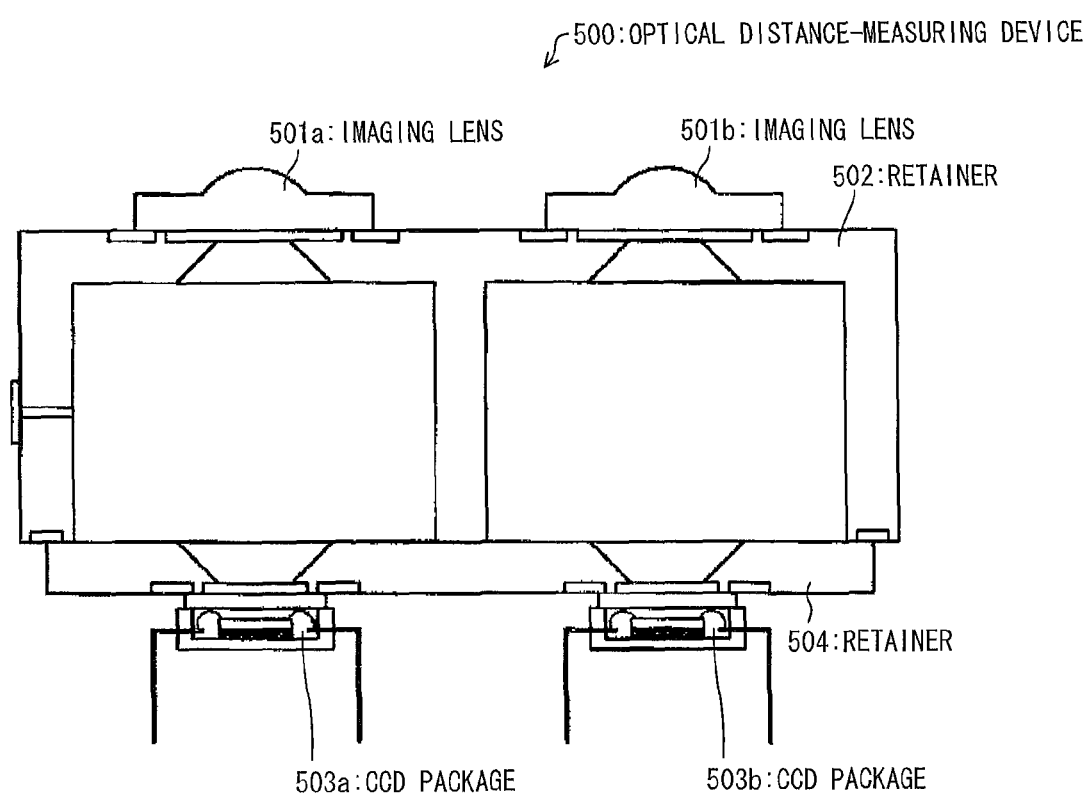
FIG. 20 is a cross-sectional view showing the configuration of a distance-measuring device described in Patent Literature 2.
Figure 21:
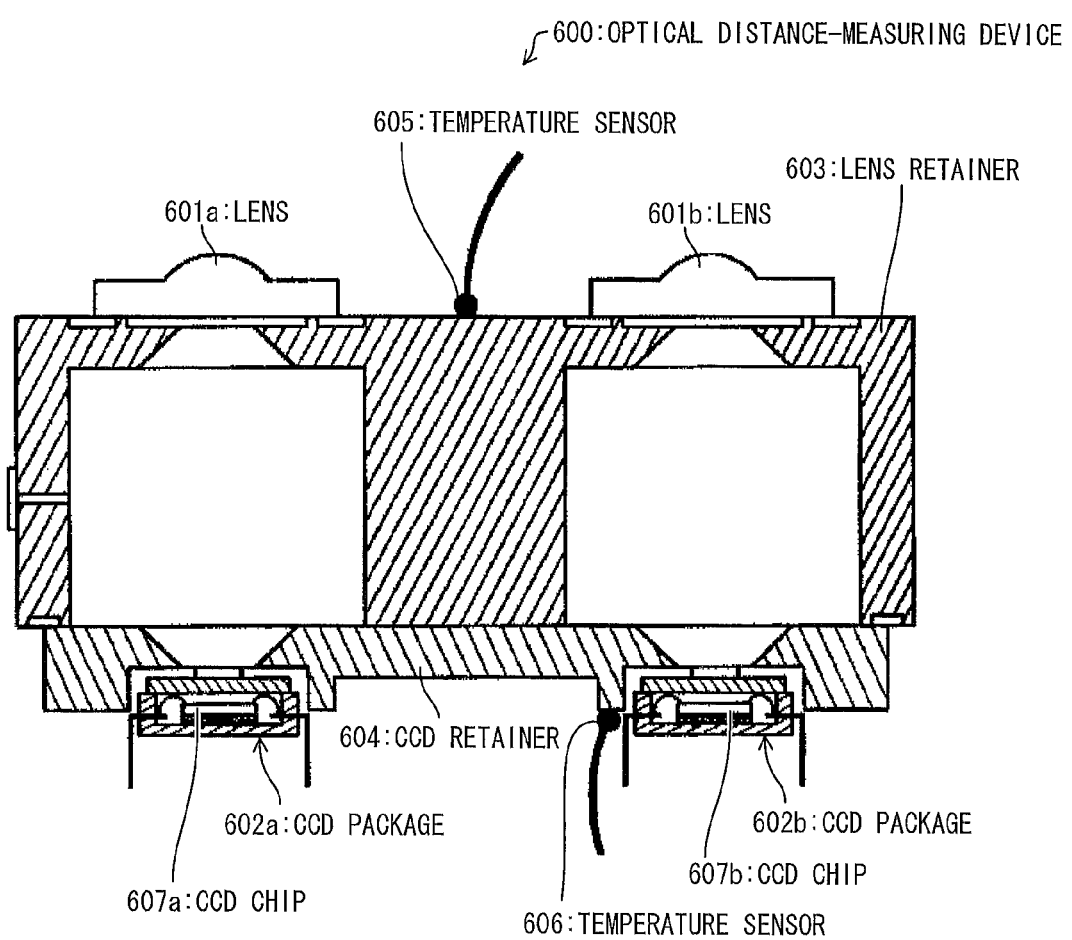
FIG. 21 is a cross-sectional view showing the configuration of a distance-measuring device described in Patent Literature 3.
Figure 22:
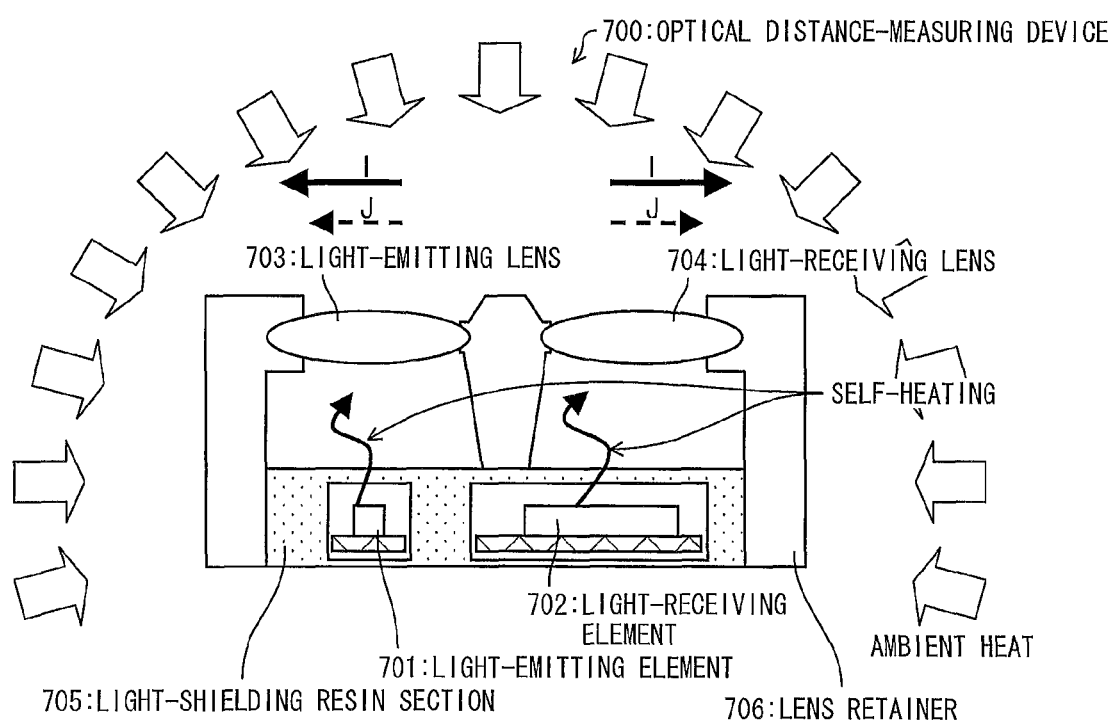
FIG. 22 is an explanatory view showing variations of the amount of change in distance between lenses due to ambient heat and self-heating in a distance-measuring device.

The following will describe a comparative example of the present invention with reference to FIGS. 16(a) and 16(b).

FIGS. 16(a) and 16(b) are a plan view and a cross-sectional view showing the configuration of an optical distance-measuring device 61 according to the present comparative example.

As shown in FIGS. 16(a) and 16(b), the optical distance-measuring device 61 includes, a light-emitting element 62, a light-receiving element 63, a leadframe 64, a light-emitting lens 65, a light-receiving lens 66, a base 67, a case 68, and a lens frame 69.

The light-emitting element 62 and the light-receiving element 63 formed on the leadframe 64 are sealed with the base 67 composed of a light-shielding resin. The base 67 has light-shielding walls 67a and side walls 67b. The light-shielding walls 67a shield light emitted from the light-emitting element 62 and light incident onto the light-receiving element 63. The side walls 67b are formed on lateral sides of the base 67. Further, the case 68 composed of a light-shielding resin is formed so as to cover the side walls 67b therewith.

The lens frame 69 is formed from metal in flat-plate shape and retains the light-emitting lens 65 and the light-receiving lens 66. The lens frame 69 is retained so as to be interposed between the base 67 and the case 68.

In the optical distance-measuring device 61 with the configuration as described above, the lens frame 69 is formed from metal having a thermal expansion coefficient lower than that of the light-shielding resin used to form the base 67 and case 68. With this configuration, even when the base 67 and the case 68 are thermally expanded due to ambient heat or self-heating of the light-emitting element 62 and the light-receiving element 63, the lens frame 69 hardly expands. Therefore, there is little difference between the amount of change in distance between the light-emitting lens 65 and the light-receiving lens 66 due to ambient heat and the amount of change in distance between the light-emitting lens 65 and the light-receiving lens 66 due to self-heating. Thus, unlike the optical distance-measuring device 600, the optical distance-measuring device 61 can prevent decreased distance measurement accuracy while eliminating difference between the amount of change in distance between the lenses due to ambient heat and the amount of change in distance between the lenses due to self-heating.

However, in case where the optical distance-measuring device 61 is subjected to reflow soldering, its ambient temperature rises to the order of 260° C. for a short time. This causes great expansion of resins making up the light-emitting lens 65, the light-receiving lens 66, the base 67, and the case 68. On the contrary, metals making up the leadframe 64 and the lens frame 69 hardly expand because the metals have thermal expansion coefficients lower than those of the resins.

Thus, great stress resulting from difference in thermal expansion coefficient generates at the interface between the base 67 and the lens frame 69 and at the interface between the case 68 and the lens frame 69. This results in sliding of the lens frame 69 over the resins making up the base 67 and the case 68. The occurrence of such sliding, when the ambient temperature returns to room temperature after reflow, cause changes in relative positional relation between the light-emitting lens 65 and the light-emitting element 62 and in relative positional relation between the light-receiving lens 66 and the light-receiving element 63 as compared to original positional relations obtained before the optical distance-measuring device 61 is subjected to reflow. This changes the position of the reflected light spot obtained by the aforementioned principle of the triangulation, causing the problem that a value of distance measured shifts from a correct value.

On the contrary, the optical distance-measuring devices 1, 21, and 31 according to the aforementioned embodiments can suppress the occurrence of the sliding as described above by retaining the lens frame 11 with the anchors 10a. Thus, it is possible to prevent the distance measurement accuracy from decreasing against much heat used during reflow.

[Supplementary Remarks]

The present embodiment can be expressed as follows.

An optical distance-measuring device is an optical distance-measuring device that measures a distance to an object subject to distance measurement, and the optical distance-measuring device includes: a light-emitting element mounted on a mounting member; a light-emitting lens that irradiates the object subject to distance measurement with light emitted from the light-emitting element; a light-receiving element, mounted on the mounting member, that detects a position of convergence of light reflected by the object subject to distance measurement; a light-receiving lens that causes the reflected light to converge onto the light-receiving element; a light-transmitting resin member that causes the light-emitting element and the light-receiving element to be sealed therewith; a first light-shielding resin member that causes the light-transmitting resin member to be sealed therewith; a lens frame, formed from metal, to which the light-emitting lens and the light-receiving lens are provided; and a second light-shielding resin member that causes the first light-shielding resin member to be sealed therewith and retains the lens frame together with the first light-shielding resin member, wherein the lens frame has through holes provided at predetermined positions, the first light-shielding resin member has respective fixing slots provided at positions corresponding to the through holes of the lens frame, and the second light-shielding resin member has filled parts formed by filling a light-shielding resin into the through holes and the fixing slots.

In the above configuration, the second light-shielding resin member has filled parts formed by filling the light-shielding resin, through the through holes formed in the lens frame, into the fixing slots formed in the first light-shielding resin member. This allows the lens frame to be fixed with the filled parts in a state that the lens frame is retained by the first light-shielding resin member and the second light-shielding resin member. Therefore, even when stresses caused by thermal expansion work at the interfaces between the lens frame and the first and second light-shielding resin members due to ambient temperature changes caused during reflow of the optical distance-measuring device, sliding does not occur at the interfaces between the lens frame and the first and second light-shielding resin members.

Further, the filled parts are formed by causing the light-shielding resin poured into the through holes and the fixing slots with no space to solidify. On the contrary, in a structure in which fixing parts such as a pin, instead of the filled parts, are inserted into the through holes and the fixing slots, a clearance for insertion of the fixing part is required to be provided between the fixing part and the through hole and fixing slot. This clearance causes displacement between the first and second light-shielding resin members and the lens frame. The filled part eliminates such a clearance, which eliminates displacement between the first and second light-shielding resin members and the lens frame.

Therefore, even after reflow, the light-emitting lens and the light-receiving lens are kept in relative position to the light-emitting element and the light-receiving element. Thus, it is possible to maintain heat resistance and distance measurement accuracy of the optical distance-measuring device at high levels.

Further, an optical distance-measuring device according to the present invention can be expressed as follows.

An optical distance-measuring device is an optical distance-measuring device that measures a distance to an object subject to distance measurement, including: a light-emitting element mounted on a mounting member; a light-emitting lens that irradiates the object subject to distance measurement with light emitted from the light-emitting element; a light-receiving element, mounted on the mounting member, that detects a position of convergence of light reflected by the object subject to distance measurement; a light-receiving lens that causes the reflected light to converge onto the light-receiving element; light-transmitting resin members that causes the light-emitting element and the light-receiving element to be sealed therewith; a first light-shielding resin member that covers the light-transmitting resin so as to form an interior space that allows the light emitted from the light-emitting element to reach the light-emitting lens and an interior space that allows the reflected light entered from the light-receiving lens to reach the light-receiving element; a lens frame, formed from metal, that retains the light-emitting lens and the light-receiving lens; and a second light-shielding resin member that causes the first light-shielding resin member to be sealed therewith and retains the lens frame together with the first light-shielding resin member, the lens frame having through holes, one of the first light-shielding resin member and the second light-shielding resin member having projections that project toward the other resin member, the other resin member being connected with jutting parts of the respective projections in such a state that the projections pass through the corresponding through holes and jut from the lens frame.

In the optical distance-measuring device, it is preferable that the first light-shielding resin member has fixing slots provided at positions corresponding to the through holes of the lens frame, and that the second light-shielding resin member has the projections which are formed by filling a light-shielding resin for the second light-shielding resin member into the through holes and the fixing slots.

In the above configuration, the projections of the second light-shielding resin member are formed by filling a light-shielding resin into the through holes and the fixing slots. With this configuration, it is possible to obtain a connection structure of the first light-shielding resin member and the second light-shielding resin member. Further, the projections are brought into close contact with the through holes and the fixing slots, which allows the lens frame to be securely fixed to the first and second light-shielding resin members.

Alternatively, in the optical distance-measuring device, it is preferable that the first light-shielding resin member has the projections, and that connection of the second light-shielding resin member with the projections is realized by covering the lens frame with a light-shielding resin.

In the above configuration, connection of the second light-shielding resin member with the projections of the first light-shielding resin member is realized by covering the lens frame with a light-shielding resin for the second light-shielding resin member. With this configuration, it is possible to obtain a connection structure of the first light-shielding resin member and the second light-shielding resin member. Further, the projections, which pass through the through holes, can be used as a fiducial for positioning the lens frame at the placement of the lens frame on the first light-shielding resin member. Therefore, it is possible to facilitate positioning of the lens frame at the placement of the lens frame on the first light-shielding resin member in the manufacture of the optical distance-measuring device.

In the optical distance-measuring device, it is preferable that the through holes comprise at least two through holes provided in an area of the lens frame between the light-emitting lens and the light-receiving lens.

In the above configuration, at least two through holes are formed in an area of the lens frame between the light-emitting lens and the light-receiving lens, and the fixing slots are formed at the positions corresponding to the through holes, accordingly. This eliminates sliding of the lens frame in a direction of rotation about the fixing slots at the ambient temperature changes. Further, the lens frame is fixed between the light-emitting lens and the light-receiving lens. This makes it possible to suppress the occurrence of sliding of the edge of the lens frame greatly affected by a difference in degree of thermal expansion between the first and second light-shielding resin members and the lens frame. Thus, it is possible to decrease the influence on relative positions of the light-emitting lens and the light-receiving lens to the light-emitting element and the light-receiving element.

In the optical distance-measuring device, it is preferable that the through holes comprise at least two through holes provided at an end side of the lens frame.

In the above configuration, at least two through holes are formed at an end side of the lens frame, and the fixing slots are formed at the positions corresponding to the through holes, accordingly. This eliminates sliding of the lens frame in a direction of rotation about the fixing slots at the ambient temperature changes. Further, the lens frame is fixed at the end side of the lens frame. This makes it possible to suppress the occurrence of sliding of the edge of the lens frame greatly affected by a difference in degree of thermal expansion between the first and second light-shielding resin members and the lens frame. Thus, it is possible to decrease the influence on relative positions of the light-emitting lens and the light-receiving lens to the light-emitting element and the light-receiving element.

In the optical distance-measuring device, it is preferable that the through holes are provided at four corners of the lens frame, respectively.

In the above configuration, the through holes are provided at four corners of the lens frame, respectively, and the fixing slots are formed at the positions corresponding to the through holes, accordingly. This eliminates sliding of the lens frame in a direction of rotation about the fixing slots at the ambient temperature changes. Further, the lens frame is securely fixed at the four corners of the lens frame. This makes it possible to more effectively suppress the occurrence of sliding of the edge of the lens frame greatly affected by a difference in degree of thermal expansion between the first and second light-shielding resin members and the lens frame. Thus, it is possible to further decrease the influence on relative positions of the light-emitting lens and the light-receiving lens to the light-emitting element and the light-receiving element.

Further, it is preferable that, in addition to the through holes provided at the four corners of the lens frame, another two through holes are provided in an area of the lens frame between the light-emitting lens and the light-receiving lens.

In the above configuration, four through holes are formed at the four corners of the lens frame, and two through holes are formed in the area of the lens frame between the light-emitting lens and the light-receiving lens. Accordingly, the fixing slots are formed at the positions corresponding to the through holes. With this configuration, all regions of the lens frame where sliding may occur are fixed. This makes it possible to greatly suppress the occurrence of sliding due to ambient temperature changes. Thus, it is possible to still further decrease the influence on relative positions of the light-emitting lens and the light-receiving lens to the light-emitting element and the light-receiving element.

In the optical distance-measuring device, it is preferable that the through holes are located at positions symmetric with respect to a center line passing through a central point of a lens's center line, which connects a center of the light-emitting lens with a center of the light-receiving lens, and being orthogonal to the lens's center line.

In the above configuration, the fixing slots are placed in the above-described positions, which allows stresses caused by ambient temperature changes to be evenly scattered. This eliminates concentration of stresses on one fixing slot, thus more effectively preventing the occurrence of sliding.

In the optical distance-measuring device, it is preferable that the lens frame has projecting parts jutting in a direction perpendicular to a surface of the lens frame, and the projecting parts have the respective through holes therein and are fit into the corresponding fixing slots.

In the above configuration, the first light-shielding resin member and the second light-shielding resin member are fixed by the light-shielding resin filled into the through holes. Further, the projecting parts of the lens frame are fit into the corresponding fixing slots, thereby being hit into fixing slots in a direction perpendicular to the surface of the lens frame where stress causing sliding works. This increases fixing force of the lens frame with respect to the first light-shielding resin member, thus more effectively preventing the occurrence of sliding.

In the optical distance-measuring device, it is preferable that the projecting parts have respective holes penetrating in a direction parallel to the surface of the lens frame.

In the above configuration, the projecting parts have the respective holes. Therefore, the first light-shielding resin member and the second light-shielding resin member are fixed by the light-shielding resin filled into the through holes that are formed in the projecting parts. With this configuration, the lens frame is fixed against stress lifting the lens frame at ambient temperature changes. Thus, it is possible to more effectively prevent the occurrence of sliding.

In the optical distance-measuring device, it is preferable that a thin film is provided on a front surface and/or a back surface of the lens frame, and the thin film is formed from a light-transmitting resin that is used to form the light-emitting lens and the light-receiving lens.

In the above configuration, the thin film formed from a light-transmitting resin that is used to form the light-emitting lens and the light-receiving lens is provided on a front surface and/or a back surface of the lens frame. This enhances adhesiveness between the metallic lens frame and the first and second light-shielding resin members. This makes it possible to prevent the occurrence of sliding of the lens frame.

In the optical distance-measuring device, it is preferable that the first light-shielding resin member is formed to be substantially symmetric with respect to a lens's center line, which connects a center of the light-emitting lens and a center of the light-receiving lens.

In the above configuration, the first light-shielding resin member is formed to be symmetric with respect to the lens's center line. Therefore, the first light-shielding resin member symmetrically expands at ambient temperature changes. This makes it possible to avoid stress from concentrating on a particular fixing slot. Thus, it is possible to effectively prevent the occurrence of sliding.

In the optical distance-measuring device, it is preferable that the first light-shielding resin member and the second light-shielding resin member are formed from an identical resin.

In the above configuration, the first and second light-shielding resin members are formed from an identical resin. Therefore, it is possible to equalize the degrees of expansion caused by ambient temperature changes between the both light-shielding resin members. This reduces stresses working at the interfaces between the lens frame and the first and second light-shielding resin members, thus preventing the occurrence of sliding of the lens frame.

In the optical distance-measuring device, it is preferable that a thermal expansion coefficient of the metal used to form the lens frame is substantially equal to thermal expansion coefficients of the first and second light-shielding resin members. In particular, when the metal used to form the lens frame is copper or a copper alloy, thermal expansion coefficients of the metal and the light-shielding resin members become substantially equal to each other.

In the above configuration, thermal expansion coefficients of the metal and the light-shielding resin members are substantially equal to each other. This makes it possible to minimize stresses working at the interfaces between the lens frame and the first and second light-shielding resin members at ambient temperature changes. This makes it possible to further prevent the occurrence of sliding of the lens frame.

Note that in the optical distance-measuring device with the configuration where the thermal expansion coefficients of the metal and the light-shielding resin members are substantially equal to each other, changes in distance between the light-emitting lens and the light-receiving lens vary depending upon whether thermal expansion is caused by ambient heat or self-heating, as in the case with the conventional optical distance-measuring device wherein the light-emitting lens and the light-receiving lens are retained by a resin component. However, if it is necessary to give a higher priority to preventing sliding of the lens frame during reflow by improving temperature characteristics (suppressing thermal expansion of the lens frame) to eliminate the distance variation, it is preferable to adopt the above configuration.

The electronic device according to the present invention is equipped with any of the above-described optical distance-measuring devices.

Thus, the optical distance-measuring device, when installed in a personal computer, home electric appliances used in a kitchen, and sanitary apparatuses, can detect a distance to a user to control devices and can be used as a sensor that controls electronic devices by functioning as a non-contact switch or a non-contact controller.

The present invention is not limited to the aforementioned embodiments and is susceptible of various changes within the scope of the accompanying claims. That is, embodiments obtained by suitable combinations of technical means changed within the scope of the accompanying claims are also included within the technical scope of the present invention.

INDUSTRIAL APPLICABILITY

An optical distance-measuring device of the present invention can be suitably used when installed in electronic devices by reflow soldering.

REFERENCE SIGNS LIST

1 Optical distance-measuring device
2 Light-emitting element
3 Light-receiving element
4 Leadframe (mounting member)
5 Light-emitting lens
6 Light-receiving lens
7 Light-emitting side first mold (light-transmitting resin member)
8 Light-receiving side first mold (light-transmitting resin member)
9 Second mold (first light-shielding resin member)
9a-9f Fixing slots
9g Positioning pin (projection)
9h Fixing pin (projection)
10 Third mold (Second light-shielding resin member)
10a Anchor (projection)
10b Protrusion
11 Lens frame
11a-11f Through holes
11g Projecting part
11h Lateral slot (hole)
11i Positioning hole
21 Optical distance-measuring device
22 Lens-equipped lens frame
31 Optical distance-measuring device
32 Lens-equipped lens frame
33 Thin film section (thin film)
51 Personal computer (electronic device)

The invention claimed is:

1. An optical distance-measuring device that measures a distance to an object subject to distance measurement, comprising:
    a light-emitting element mounted on a mounting member;
    a light-emitting lens that irradiates the object subject to distance measurement with light emitted from the light-emitting element;
    a light-receiving element, mounted on the mounting member, that detects a position of convergence of light reflected by the object subject to distance measurement;
    a light-receiving lens that causes the reflected light to converge onto the light-receiving element;
    light-transmitting resin members that causes the light-emitting element and the light-receiving element to be sealed therewith;
    a first light-shielding resin member that covers the light-transmitting resin member so as to form an interior space that allows the light emitted from the light-emitting element to reach the light-emitting lens and an interior space that allows the reflected light entered from the light-receiving lens to reach the light-receiving element;
    a lens frame, formed from the metal, that retains the light-emitting lens and the light-receiving lens; and
    a second light-shielding resin member that causes the first light-shielding resin member to be sealed therewith and retains the lens frame together with the first light-shielding resin member,
    the lens frame having through holes,
    one of the first light-shielding resin member and the second light-shielding resin member having projections that project toward the other resin member, the other resin member being connected with jutting parts of the respective projections in such a state that the projections pass through the corresponding through holes and jut from the lens frame.

2. The optical distance-measuring device according to claim 1, wherein
    the first light-shielding resin member h as fixing slots provided at positions corresponding to the through holes of the lens frame, and
    the second light-shielding resin member has the projections which are formed by filling a light-shielding resin for the second light-shielding resin member into the through holes and the fixing slots.

3. The optical distance-measuring device according to claim 1, wherein
    the first light-shielding resin member has the projections, and
    connection of the second light-shielding resin member with the projections is realized by covering the lens frame with a light-shielding resin.

4. The optical distance-measuring device according to claim 1, wherein
    the through holes comprise at least two through holes provided in an area of the lens frame between the light-emitting lens and the light-receiving lens.

5. The optical distance-measuring device according to claim 1, wherein
    the through holes comprise at least two through holes provided at an end side of the lens frame.

6. The optical distance-measuring device according to claim 5, wherein
    the through holes are provided at four corners of the lens frame, respectively.

7. The optical distance-measuring device according to claim 6, wherein the through holes comprise two through holes provided in an area of the lens frame between the light-emitting lens and the light-receiving lens.

8. The optical distance-measuring device according to claim 4, wherein
the through holes are located at positions symmetric with respect to a center line passing through a central point of a lens's center line, which connects a center of the light-emitting lens with a center of the light-receiving lens, and being orthogonal to the lens's center line.

9. The optical distance-measuring device according to claim 2, wherein
the lens frame has projecting parts jutting in a direction perpendicular to a surface of the lens frame, and the projecting parts have the respective through holes therein and are fit into the corresponding fixing slots.

10. The optical distance-measuring device according to claim 9, wherein
the projecting parts have respective holes penetrating in a direction parallel to the surface of the lens frame.

11. The optical distance-measuring device according to claim 1, wherein
a thin film is provided on a front surface and/or a back surface of the lens frame, and the thin film is formed from a light-transmitting resin that is used to form the light-emitting lens and the light-receiving lens.

12. The optical distance-measuring device according to claim 1, wherein
the first light-shielding resin member is formed to be substantially symmetric with respect to a lens's center line, which connects a center of the light-emitting lens and a center of the light-receiving lens.

13. The optical distance-measuring device according to claim 1, wherein
the first and second light-shielding resin members are formed from an identical resin.

14. The optical distance-measuring device according to claim 1, wherein
a thermal expansion coefficient of the metal used to form the lens frame is substantially equal to thermal expansion coefficients of the first and second light-shielding resin members.

15. The optical distance-measuring device according to claim 14, wherein
the metal used to form the lens frame is copper or a copper alloy.

16. An electronic device including an optical distance-measuring device according to claim 1.

* * * * *